United States Patent
Ma

(10) Patent No.: US 9,501,464 B2
(45) Date of Patent: Nov. 22, 2016

(54) METHODS AND APPARATUS FOR MANAGING DATA RELATING TO POTENTIALLY CHANGING CONDITIONS OF MULTIPLE SUBJECTS

(71) Applicant: Cleverex Systems, Inc., Reston, VA (US)

(72) Inventor: Lihong Leon Ma, Great Falls, VA (US)

(73) Assignee: CLEVEREX SYSTEMS, INC., Reston, VA (US)

( * ) Notice: Subject to any disclaimer, the term of this patent is extended or adjusted under 35 U.S.C. 154(b) by 222 days.

(21) Appl. No.: 14/224,322

(22) Filed: Mar. 25, 2014

(65) Prior Publication Data

US 2015/0278185 A1    Oct. 1, 2015

(51) Int. Cl.
| | | |
|---|---|---|
| G06F 17/00 | (2006.01) | |
| G06F 17/24 | (2006.01) | |

(Continued)

(52) U.S. Cl.
CPC ......... *G06F 17/246* (2013.01); *G06Q 10/1093* (2013.01); *G06Q 50/26* (2013.01); *G06F 17/245* (2013.01)

(58) Field of Classification Search
CPC ............... G06Q 10/06; G06Q 10/10; G06Q 10/1093; G06Q 50/26; G06F 19/322;

(Continued)

(56) References Cited

U.S. PATENT DOCUMENTS 5,890,905 A * 4/1999 Bergman ............... G06Q 40/00
434/107
8,321,806 B2 * 11/2012 Agrusa ............. G05B 23/0267
700/17

(Continued)

OTHER PUBLICATIONS

Cleverex, "myHeadStart.com homepage," archived by WayBack Machine (www.archive.org) on Mar. 7, 2013, 1 page.*

(Continued)

*Primary Examiner* — Cesar Paula
*Assistant Examiner* — James H Blackwell
(74) *Attorney, Agent, or Firm* — Kenealy Vaidya LLP

(57) ABSTRACT

Some embodiments are directed to a computer program for facilitating management and processing of data relating to changing conditions of multiple subjects involved in a government-sponsored social program. The computer program is configured for implementation by a processor to display multiple subjects, which form a group of subjects involved in the government-sponsored social program, in one of a column and row format. Multiple requirements, which each are required to be satisfied within a certain deadline pursuant to the government-sponsored social program, are displayed in the other of the column and row format, such that the displayed multiple subjects and multiple requirements form a matrix. One of multiple identifiers, which are displayed at each of the intersections of the matrix, each indicate status of the requirement relevant to the associated subject, each of the multiple identifiers being visually unique to enable identification of the relevant status.

25 Claims, 28 Drawing Sheets

(51) Int. Cl.
*G06Q 50/26* (2012.01)
*G06Q 10/10* (2012.01)

(58) Field of Classification Search
CPC ............... G06F 19/327; G06F 19/3487; G06F 17/246; G06F 17/245
See application file for complete search history.

(56) References Cited

U.S. PATENT DOCUMENTS

| | | | |
|---|---|---|---|
| 2009/0164249 A1* | 6/2009 | Hunt | G06Q 10/00 705/3 |
| 2010/0017738 A1* | 1/2010 | Rhodes | G06Q 10/06 715/772 |
| 2013/0041703 A1* | 2/2013 | Ganji | G06Q 10/10 705/7.11 |
| 2013/0117674 A1* | 5/2013 | Adams | G06F 3/01 715/736 |
| 2013/0268911 A1* | 10/2013 | Charfi | G06Q 10/06 717/105 |
| 2015/0066521 A1* | 3/2015 | Buckley | G06F 19/327 705/2 |

OTHER PUBLICATIONS

Cleverex, "PROMIS v.5.16 2011 PIR Manual," dated May 6, 2011, 98 pages.*
Lihong, Ma, "P2OTM Based Health Management Methodology by myHeadStart.com," PowerPoint file having a creation date of Apr. 27, 2013, with last edit date of May 10, 2013, 8 slides.*

* cited by examiner

| Group Data Entry | Workbook | | | | | | | | | | | |
|---|---|---|---|---|---|---|---|---|---|---|---|---|
| | | | | Family Advocate Workbook | | | | | | | | |
| | | | | Setting Export to PDF Flag: ☐ Greyscale flags | | | | | | | | |
| Participant (Age) | Medical Home | Medical Insurance | Dental Home | Physical Exam | Height Weight | Hearing | Vision | Mental Health | Dental | Nutrition | Immunization | EPSDT |
| Andrew Bellamy (M 4 Yrs) | ☐ | ■ | ■ | 9/15/2013 | 2/21/2014 | 2/3/2014 | ☐ | ☐ | ■ | ☐ | Past Due | ■ |
| Suzie May Brown (F 5 Yrs) | ☐ | ■ | ■ | ☐ | 9/25/2013 | ☐ | ☐ | 10/16/2013 | ☐ 9/25/2013 | 9/5/2013 | Past Due | ■ |
| Hannah Hulihan (F 4 Yrs) | ☐ | ■ | ■ | ☐ | ☐ | ☐ | ☐ | ■ | ■ | ☐ | | ☐ |
| Mary Ingals (F 4 Yrs) | ☐ | ■ | ■ | ☐ | ☐ | ☐ | ☐ | ■ 10/16/2013 | ■ | ☐ | Past Due | ☐ |
| Dopey Dwarf (M 4 Yrs) | ☐ | ■ | ■ | ☐ | ☐ | ☐ | ☐ | ■ | ■ | ☐ | Past Due | ☐ |
| Sue jones (F 5 Yrs) | ☐ | ■ | ☐ | 15/4/2013 | ☐ | ☐ | ☐ | ■ | ☐ | ☐ | | ☐ |
| Lilly Espinal (4 Yrs) | ☐ | ☐ | ☐ | ☐ | ☐ | ☐ | ☐ | ■ | ☐ | ☐ | Past Due | ☐ |
| Carrie Dyson (F 5 Yrs) | ☐ | ✠ | ✠ | ☐ | ☐ | ☐ | ☐ | ■ | ☐ | ☐ | Past Due | ☐ |
| Marques Mitchell (M 4 Yrs) | ☐ | ☐ | ■ | ☐ | ☐ | ☐ | ☐ | ■ | ✠ | ☐ | Past Due | ☐ |
| Dear Student (M 13 Months) | ☐ | ☐ | ☐ | 11/25/2013 | ☐ | ☐ | ☐ | 1/8/2014 | ☐ | ☐ | Current | ☐ |

201 / 203 / 205 / Folders

Legend: ● Past Due | ⬛ Coming soon | ◆ Current | ◆ Beyond Grace Period Flag | Greyscale flags
■ Past Due | ▦ Coming soon | ☐ Current | ▦ Beyond Grace Period Flag | Greyscale flags
✗ Past Due | ⊘ Coming soon | ✓ Current | ● Beyond Grace Period Flag | Greyscale flags

FIG. 2

Family Advocate Workbook

Setting | Export to PDF | Flag: | Greyscale flags

| Participant (Age) | Medical Home | Medical Insurance | Dental Home | Physical Exam | Height Weight | Hearing | Vision | Mental Health | Dental | Nutrition | Immunization | EPSDT |
|---|---|---|---|---|---|---|---|---|---|---|---|---|
| Andrew Bellamy (M 4 Yrs) | ☐ | ■ | ■ Past Due | ☐ 9/15/2013 | ☐ 2/21/2014 | ☐ 2/3/2014 | ☐ | ■ 10/16/2013 | ■ | ☐ 9/5/2013 | Past Due | ■ |
| Suzie May Brown (F 5 Yrs) | ☐ | ■ | ■ | ☐ | ☐ 9/25/2013 | ☐ | ☐ | ☐ 10/16/2013 | ☐ 9/25/2013 | ☐ | Past Due | ■ |
| Hannah Hullihan (F 4 Yrs) | ☐ | ■ | ■ | ☐ | ☐ | ☐ | ☐ | ■ | ■ | ☐ | | ☐ |
| Mary Ingalls (F 4 Yrs) | ☐ | ■ | ■ | ☐ | ☐ | ☐ | ☐ | ■ | ■ | ☐ | Past Due | ☐ |
| Dopey Dwarf (M 4 Yrs) | ☐ | ■ | ■ | ☐ | ☐ | ☐ | ☐ | ■ | ■ | ☐ | Past Due | ☐ |
| Sue Jones (F 5 Yrs) | ☐ | ■ | ■ | ☐ | ☐ | ☐ | ☐ | ■ | ☐ | ☐ | | ☐ |

FIG. 3

Family Advocate Workbook

Setting | Export to PDF | Flag: | Greyscale flags

| Participant (Age) | Medical Home | Medical Insurance | Dental Home | Physical Exam | Height Weight | Hearing | Vision | Mental Health | Dental |
|---|---|---|---|---|---|---|---|---|---|
| Andrew Bellamy (M 4 Yrs) | ☐ | ■ | ☐ | 9/15/2013 | 2/21/2014 | 2/3/2014 | ☐ | ■ 10/16/2013 | ☐ |
| Suzie May Brown (F 5 Yrs) | ☐ | ■ | ■ | | 9/25/2013 | | | | ■ 9/25/2013 |
| Hannah Hullihan (F 4 Yrs) | ☐ | ■ | ☐ | | | | | ■ 10/16/2013 | |
| Mary Ingals (F 4 Yrs) | ☐ | ■ | | | | | | | |
| Dopey Dwarf (M 4 Yrs) | ☐ | ■ | | | | | | | |
| Sue Jones (F 5 Yrs) | ☐ | ■ | | | | | | | |
| Lilly Espinal (4 Yrs) | ☐ | ⟲ | | | | | | | |
| Carrie Dyson (F 5 Yrs) | ☐ | ☐ | | | | | | | |
| Marques Mitchell (M 4 Yrs) | ☐ | | | | | | | | |
| Dear Student (M 13 Months) | ☐ | | | | | | | | |

401

Viewing: Andrew Bellamy [M 4 Yrs]  PID:853 DOB:3/3/2010 Age:4 Yrs Family Advocate
FID:289 Currently: 1st Year Enrollment from 09/05/2

Medical Insurance

| | Insurance Type | Effective | Expiration Date | Primary Insurance |
|---|---|---|---|---|
| ⟲ | Medicare Mediciad** | 9/5/2013 | | Yes |

Export to PDF | Close

FIG. 4

Family Advocate Workbook

[Setting] [Export to PDF] Flag: [Greyscale flags]

| Participant (Age) | Medical Home | Medical Insurance | Dental Home | Physical Exam | Height Weight | Hearing | Vision | Mental Health | Dental | Nutrition |
|---|---|---|---|---|---|---|---|---|---|---|
| Andrew Bellamy (M 4 Yrs) | ☐ | ☐ (501) | ■ | ☐ 9/15/2013 | ☐ 2/21/2014 | ☐ 2/3/2014 | ☐ | ■ 10/16/2013 | ■ | ☐ 9/5/2013 |
| Suzie May Brown (F 5 Yrs) | ☐ | ■ | ■ | ☐ | ☐ 9/25/2013 | ☐ | ☐ | ☐ 10/16/2013 | ☐ 9/25/2013 | ☐ |
| Hannah Hullihan (F 4 Yrs) | ☐ | ■ | ■ | ☐ | ☐ | ☐ | ☐ | ■ | ■ | ☐ |
| Mary Ingals (F 4 Yrs) | ☐ | ■ | ■ | ☐ | ☐ | ☐ | ☐ | ■ | ■ | ☐ |
| Dopey Dwarf (M 4 Yrs) | ☐ | ■ | ■ | ☐ | ☐ | ☐ | ☐ | ■ | ■ | ☐ |
| Sue Jones (F 5 Yrs) | ☐ | ■ | ■ | ☐ | ☐ | ☐ | ☐ | ■ | ☐ | ☐ |

| Event | User Group 701 | Display Participant Listings 707 | Send Alert Now |
|---|---|---|---|
| Add new pop alert subscription for events expired and about to expire setting | | | |
| Developmental Assessment 703 | FSW | YES | Send Alert Now |
| Physical Exam 705 | FSW | YES | Send Alert Now |

POP ALERT SUBSCRIPTION FOR EVENTS EXPIRED AND ABOUT TO EXPIRE SETTING

Export to PDF    Close

Close

FIG. 7

ERSEA | Mandates | Events | Mental Health | Dental Health | Physical and Medical Tests | CLASS | Staff Check List Recruitment | Enrollment | Attendance & Vacancies | Transition | Management Recruitment  [Print]

January 16, 2014

Program: [Head start] 803  [Setting]

|  |  | Program Status 801 | | | IEP/IFSP | Age 805 | | | | | | Eligibility Category 807 | | | |
|---|---|---|---|---|---|---|---|---|---|---|---|---|---|---|---|
|  |  |  |  |  |  |  |  |  |  |  | Income | | | | Public |
| Month | Location | Applied | Waiting List | Accepted | Application Withdrawn | # | 0-1 | 1-2 | 2-3 | 3-4 | 4-5 | 0-100% | Foster | Homeless | Assistance |
| January to date | Fall Church HS | 82! | 8 | 12 | 0 | 4 | 0 | 4 | 3 | 15 | 24 | 20 | 2 | 5 | 13 |
| October | Fall Church HS | 87! | 10 | 17 | 0 | 1 | 1 | 6 | 7 | 4 | 0 | 24 | 2 | 6 | 15 |
| August | Fall Church HS | 87! | 10 | 17 | 0 | 1 | 1 | 6 | 7 | 4 | 0 | 0 | 0 | 0 | 0 |

FIG. 8

| ERSEA | Mandates | Events | Mental Health | Dental Health | Physical and Medical Tests | CLASS | Staff Check List |

Recruitment | Enrollment | Attendance & Vacancies | Transition Management

Enrollment [Print]

January 16, 2014

Program: [Head start] [Setting]

⌐ 903

| | | Enrollment 901 | | | IEP/IFSP | | Age | | | | | | Eligibility Category 905 | | |
|---|---|---|---|---|---|---|---|---|---|---|---|---|---|---|---|
| | | | | | | | | | | | | Income | | | Public |
| Month | Location | Cumulative | Funded | Current | # | % | 0-1 | 1-2 | 2-3 | 3-4 | 4-5 | 0-100% | Foster | Homeless | Assistance |
| January to date | Fall Church HS | 82! | 8 | 12 | 4 | 20% | 0 | 4 | 3 | 15! | 24 | 20 | 2 | 5 | 13 |
| October | Fall Church HS | 87! | 10 | 17 | 1 | 20% | 1 | 6 | 7 | 4 | 0 | 24 | 2 | 6 | 15 |
| August | Fall Church HS | 87! | 10 | 17 | 1 | 25% | 1 | 6 | 7 | 4 | 0 | 0 | 0 | 0 | 0 |

FIG. 9

| ERSEA | Mandates | Events | Mental Health | Dental Health | Physical & Medical Tests | Immunization | Medical Conditions |

POP – Mental Health [Print]
January 16, 2014

Program: [Head Start]   Total Enrolled: 20   [Setting]

| Location | Screened 1103 | No Score entered 1105 | Screening Result 1101 ||||| Assessment 1115 ||||
| | | | Scored Entered 1107 ||||| Consulted With || Individual Assessment 1117 | Facilitated a referral 1119 |
| | | | No Concern 1109 | Reassess 1111 | Referral 1113 | N/A | | Staff | Parent | | |
| ⊞ Falls Church HS | 20 (100%) | 18 | 0 | 0 | 2 | 0 | | 0 | 0 | 0 | 0 |
| ⊟ Richmond Family Services | 20 (100%) | 18 | | | | | | | | | |
| ⊟ North Center | 20 (100%) | 18 | | | | | | | | | |
| Badger am | 11 (100%) | 10 | | | | | | | | | |
| Bonnie | 9 (100%) | 8 | | | | | | | | | |

FIG. 11

| Inbox | POP | Reports | Navigators | PIR | Letters | Builders | Customization | Data Management |
|---|---|---|---|---|---|---|---|---|
| Physical and Medical Tests | Immunization | Medical Conditions | Nutrition | CLASS | Disabilities | | | |

POP - Immunization [Print]
February 11, 2014

Program: [Head Start]  Total Enrolled: 19  [Refresh]  [Setting]  Flag: [Greyscale flags]

_1203_ _1205_ _1207_ Results _1201_

| Location | Immunization | ■ Past Due | □ Current | ▣ Complete | No Date | Other |
|---|---|---|---|---|---|---|
| ⊞ Falls Church HS | Overall 1209 | 14 | 1 | | 3 | 1 |
| ⊞ Falls Church HS | DTaP/DTP | 11 | 3 | 1 | 3 | 1 |
| ⊞ Falls Church HS | Hep A | 10 | 3 | 1 | 3 | 2 |
| ⊞ Falls Church HS | Hep B | 12 | 1 | 2 | 3 | 1 |
| ⊞ Falls Church HS | Hib | 12 | 2 | 2 | 3 | 1 |
| ⊞ Falls Church HS | Influenza | 13 | 3 | | 3 | |
| ⊞ Falls Church HS | Meningococcal | | 4 | | 16 | 1 |
| ⊞ Falls Church HS | MMR | 11 | 1 | 2 | 3 | 1 |
| ⊞ Falls Church HS | Pneumococcal | 12 | 2 | 1 | 3 | 1 |
| ⊞ Falls Church HS | Polio | 12 | 1 | 1 | 3 | 1 |
| ⊞ Falls Church HS | Rotavirus | 12 | | | 3 | 1 |

POP ALERT SUBSCRIPTION FOR EVENTS EXPIRED AND ABOUT TO EXPIRE SETTINGS

| | Event | User Group 2001 | Display Participant Listings 2009 | Send Alert Now |
|---|---|---|---|---|
| ✚ | Add new pop alert subscription for events expired and about to expire setting | | | |
| ≫ | Developmental Assessment 2003 | FSW | YES | Send Alert Now |
| | Medical Home 2005 | Data Entry | YES | Send Alert Now |
| | Physical Exam 2007 | FSW | YES | Send Alert Now |
| | Vision (Test or Screening) | Data Entry | | Send Alert Now |
| | Hearing (Test or Screening) | Data Entry | | Send Alert Now |

Export to PDF | Close

Close

| Users | Groups | Roles | User Monitoring | Access | IP Settings | Family Advocates View |

Users

Filter: Off     Page [1] of 5

| Full Name | User Name | Status |
|---|---|---|
| Aaron Aardvark [v] | User 52 | Active |
| Abe Fish Pagoda | jk@yahoo.com | Active |
| Alexandria Test | ATest | Active |
| Amanda South | User53 | Active |
| Amanda Thayer | AThayer | Active |
| Amy Aardvark [v] | Amy | Active |
| Amy Dallas | AmyDallas | Active |
| ANew Teacher | anew@ghy.org | Active |
| Angela Nordstrom | ANordstrom | Active |
| Angie Marie Hager | AHager | Active |
| Billy Gruff | | Inactive |
| Bruce Banner | | Inactive |

Full Name: Angie Marie Hager    Status: Active

Login Name: AHager    Reset Password

Access Summary   User Groups   Organizational Access 2201

Overall Organizational Access Level: ——

[+] Reston Delegate ——

[-] Reston Dir    2205

[-] Richmond Family Services   Full Access 2203

[-] Center 01   Full Access

A   Full Access

B   Full Access

Child Care Room 1   Full Access

PreSchool   Full Access

Toddler   Full Access

[-] Center 02   Full Access

Heidi class   Full Access

Viewing: Kerry Lynch { F 4 Yrs} 2701    PID: 931  DOB: 5/1/2009  Age: 4 Yrs  Family Advocate: Laura Cane FID: 313  Currently: 1st year Enrollment from 00/02/2013 in

| Filter | Flag: Greyscale flags | | | |
|---|---|---|---|---|
| Event Title | Timeline | Due | Catch-up | Date Occurred |
| Immunizations | 1 mo | | 5/16/2009 – 6/15/2009 | Add New |
| | 1 week | | 5/2/2009 – 5/15/2009 | Add New |
| | 12 mo | | 2/16/2010 – 5/15/2010 | Add New |
| | 15 mo | | 5/16/2010 – 8/15/2010 | Add New |
| | 18 mo | | 8/16/2010 – 11/15/2010 | Add New |
| | Newborn | | 5/1/2009 – 5/1/2009 | Add New |
| Medical Home | Medical Home | 8/2/2013 <= [ ] <= 9/2/2013 < | 9/2/2012 – 10/2/2013 | Add New |
| Medical Insurance | Medical Insurance | 8/2/2013 <= [ ] <= 9/2/2013 < | 9/2/2012 – 10/2/2013 | Add New |
| Vision Screening | 1 mo | | 7/16/2009 – 9/15/2009 | Add New |
| | 24 mo | | 11/16/2010 – 5/15/2011 | Add New |

FIG. 27

METHODS AND APPARATUS FOR MANAGING DATA RELATING TO POTENTIALLY CHANGING CONDITIONS OF MULTIPLE SUBJECTS

BACKGROUND

Some of the disclosed embodiments relate to methods and apparatus for managing data relating to potentially changing conditions of multiple subjects. Some of these embodiments are disclosed in the context of managing data relating to separate individuals, and in some cases a large number of individuals involved in government supported social programs. However, embodiments are intended to cover or otherwise apply the disclosed methods and apparatus of data management in any other beneficial context, including data relating to individuals involved in other activities or programs, or even data relating to groupings of any number of things that are subject to any type of potentially changing conditions.

The tracking of changing conditions of individuals involved in government controlled social programs often involves the management of a tremendous amount of data. For example, in the United States, Head Start (HS) and Community Action Program (CAP) constitute two programs that affect or otherwise involve a large number of separate individuals. Both of these programs are discussed in more detail below for the purpose of providing context to the task of data management.

I. Overview of HS and CAP

Both HS and CAP are funded by the U.S. Department of Health and Human Services, and eligibility for aid from these programs is based on the federal poverty guidelines, i.e., family income, number of family members, etc. HS focuses solely on children, while CAP focuses on families, such as to provide money for food, energy, food stamps, etc. Each of these programs is discussed below.

HS targets low income people, and is organized and formed within: 1) school districts, 2) city governments, 3) county governments, 4) non-profit organizations, i.e., catholic charities, etc. Most HS organizations are urban, but there are also a number located in rural areas. Most HS organizations are independently formed non-profit organizations for the sole purpose of pursuing HS.

HS only covers pre-school (birth to 5 years old), and after that the children attend public school. Some benefits of HS are based on studies showing that people are ultimately more successful if they attend pre-school. Early HS (started in the mid-1990s) covers children from birth to 3 years old, and traditional HS (started in 1964) covers children 3-5 years old.

HS was initiated in 1964 as part of President Johnson's war on poverty. It began as a summer camp, and originally solely involved teaching children to read and write. However, HS currently involves many more subjects, and is a comprehensive child development program, covering language and literacy; cognition and general knowledge; physical development and health; social and emotional development; and approaches to learning. A significant HS goal is to break the cycle of poverty.

Family interviews can also be held to assess conditions at the home. HS has developed procedures to help build a better family environment, i.e., assess the family's needs, their strengths, etc., and prepares a family partnership agreement (FPA). This procedure thereby helps to provide a comprehensive child development plan. The program is designed to first determine the family's needs (needs assessment), and then works with the family as a partner to provide a nurturing environment for the child.

HS especially focuses on outcomes, i.e., how well the program is working. HS's outcome focused methodology is at least partially responsible for it becoming the most successful social services program, and is supported by both Democrats and Republicans in the U.S.

In order to form a HS organization, a proposal needs to be submitted to the federal government, which includes a plan of how to recruit families (i.e., children). Most HS organizations are formed for the sole purpose of promoting HS. Once formed, the federal government provides money to fund the HS organization, which constitutes a large majority of the operating budget, and attending (participating in) HS is free.

There are approximately 2000-3000 separate HS organizations (grantees and delegates) currently operating in the United States. A typical HS organization serves 100-500 families (children). There are typically 15-17 children per classroom, and 10-20 classrooms per HS organization. Each classroom has one teacher and one assistant teacher. A family advocate also works with the teachers, but from a different perspective, i.e., the advocate monitors the children's health and the family environment. Each advocate covers 1-2 classrooms, and visits the homes 1-2 times per year.

A typical HS organization begins as a grantee, and there are approximately 1600 grantee organizations currently operating in the United States. However, a HS organization may also be formed as a delegate agency that tags-on to an existing grantee's proposal, and there are approximately 3000 delegate agencies currently operating in the United States. Each delegate agency is separate from its corresponding grantee. For example, New York City's government is a grantee, with 100-200 separate associated delegate agencies throughout the city. The grantee receives federal grants to cover (fund) the associated delegate agencies. A mandatory on-site review is required every three years.

Each grantee or delegate agency receives approximately $1M-$3M a year in funding, and thus the entire HS program (covering the entire United States) receives approximately $9B-$10B in funding per year. Approximately 80% of the funding is provided by the federal government, and the remainder (approximately 20%) is provided by private local sources, i.e., private sponsors and in-kind donations.

The United States includes a few hundred CAP organizations. CAP only focuses on the family, and includes the following programs: 1) Weatherization Program—seals doors, windows, etc., such as to prevent cold air from entering the home in winter; 2) Energy Program—pays the electric bill; and 3) Food Pantry Program—provides food.

FIG. 1 is a schematic of a typical structure of a HS/CAP organization. As shown in FIG. 1, a CAP Director 103 and HS Director 105 both report to an Executive Director 101. The CAP Director 103 manages a Weatherization Program Director 107, Energy Program Director 109, and Food Pantry Program Director 111. The HS Director manages the Center Directors 113 (represented as Centers 1 through n), as well as a Content Manager 115. HS Managers include any positions that manage family data of their caseloads or classrooms 117, including Directors, Family Advocates 119, Home Visitors, Teachers 121, and Teachers' Assistants 123.

The following Directors report to the Content Manager: Mental Health Director (Psychologist) 125; Director of Physical Health (Nurse) 127; and Disabilities Director (Nurse who checks hearing, vision, and learning issues) 129. These Directors mainly work with the Family Advocates 119, i.e., the Family Advocate requests that the relevant Director observe a certain child to provide a diagnosis, who may then refer the child to a doctor, etc. For example, the Mental Health Director 125 may refer the child to a local psychologist to obtain a professional diagnosis. The Disabilities Director may refer a child to a local school system, which will then prepare an individual education plan (IEP) for the referred child.

II. Program Entry

A new grantee for HS needs to recruit preschool children, and may advertise, such as by using flyers, billboards, newspapers, events, etc., to get the word out. Low income families apply for admission by filling out an application form to determine whether they are eligible, i.e., income criteria (amount of income per family member) and age criteria (need to be 5 years old or younger).

The two stages related to entry into the program that are relevant are intake and enrollment, which are discussed below.

A. Intake

Intake begins by entering an application form. The goal of a typical HS agency is to serve 200-500 children.

At intake, the agency may receive a greater number of application forms than children that the agency can enroll; e.g., the agency may have 200 funded slots, but at intake the center may receive 300 application forms requesting enrollment. In this case, the application forms must typically be prioritized in order to determine which applications to accept, and this prioritization is accomplished using prioritization software, which uses a weighting system based on a pre-defined criteria, such as amount of income, age, etc. The prioritization software thereby ranks the children.

However, prioritization is not needed in some cases. For example, in extremely poor and isolated areas, such as at the Texas/Mexico border, everyone is such a good candidate (because of poverty, etc.) that applicants are admitted on a first-come first-served basis instead of using prioritization.

In some other cases, an agency's capacity may exceed the actual number of application forms received, e.g., the agency may have 200 funded slots, but may only receive 150 applications. In this case, the agency is allowed to enroll a certain percentage of kids who are above the poverty line. However, the families' income can never exceed 30% above the poverty line.

B. Enrollment

A number of federal rules become effective once a child is enrolled in HS, i.e., enrolled in a Classroom. These rules are in the form of 30 day, 45 day, and 90 day requirements, which are summarized as follows: 1) 30 day requirements—e.g., paperwork must be completed, confirmation of child's accessibility to medical insurance (typically Medicaid); 2) 45 day requirements—e.g., must complete child's sensory screening (vision and hearing); and 3) 90 day requirements—e.g., child must have a physical examination, which includes a referral needs to have been made to a doctor, the parents need to be informed that they need to take the child to a doctor for a physical examination, the medical examination needs to have been conducted, and the parents must provide HS with a copy of the completed examination form.

However, the HS center may attempt to exceed the above requirements (go above and beyond), such as by satisfying the 90 requirements within 45 days, satisfying the 45 requirements within 30 days, etc. If a center attempts to exceed the requirements in this manner, then the new rules apply to all applicants who are enrolled.

The health events are based on each state's recommended EPSDT (Early Periodic Screening, Diagnosis, and Treatment) schedule. However, many agencies use the American Academy of Pediatrics recommended EPSDT schedule in practice. This schedule provides a guideline for children to receive appropriate health screening, diagnosis and treatment based on age.

SUMMARY

Software tracks all services provided via HS and CAP, such as immunization schedules, CAP related activities (e.g., winterizing house), etc. The software allows each center to automate and manage its business processes, i.e., intake, prioritization, enrollment, federal mandates (30, 45, and 90 day requirements), needs assessments, service planning, family services, child health, adult health, referrals, classroom attendance, classroom observation, outcome, transition management, etc.

The disclosed systems and methods, including software, can be used for other agencies beyond HS and CAP, such as any human services organization that provides services to people in need. Software can track both services provided and outcomes, which can be important to determine the programs' effectiveness.

The accurate and efficient management of this data is especially important for various other reasons, such as because of the vulnerability of the individuals enrolled, the strict budgets available to fund the programs, etc. However, related art methods and systems, including software, fail to sufficiently address issues relating to at least one of accuracy, efficiency, and ease of use. The related art also fails to enhance the user's ability to understand, manipulate and/or otherwise use the data.

For example, related art systems focus on entering data and generating static reports. In order for HS managers or other users to monitor overall aspects, e.g., the big picture, of their operation, they are required to generate reports. These reports are typically printed on paper, and thus the printed data rapidly becomes obsolete, such as in a matter of hours or days.

A separate issue with the related art technology relates to the fact that various requirements, such as those from the federal government, local government, and other agencies, are hard-coded inside the software and reports, which creates an inherent inflexibility. For example, the software and reports must be re-designed and/or rewritten once these requirements change, which creates inefficiencies.

Thus, some of the related art methods and apparatus, including software, are subject to at one of the following limitations: (1) user difficulty in monitoring overall aspects of the operation while entering data; (2) printing reports provides access to overall aspects of the operation, but not on a real time basis, i.e., the data quickly becomes obsolete; and (3) the software and reports must be re-designed and/or rewritten once the federal government, local government and agency requirements change. It therefore may be advantageous to provide methods and apparatus for managing data relating to potentially changing conditions that address at least one of the above issues or deficiencies of the related art technology.

Some of the disclosed embodiments therefore address at least one of the above issues. Thus, some of the disclosed embodiments enable the monitoring of overall aspects of the operation (big picture) on a real time or substantially real time basis. Some of these embodiments enable this monitoring during data entry or the performance of routine monitoring tasks. Some of these embodiments integrate monitoring with data entry or data update on one screen, thereby enabling users to perform monitoring tasks and data entry or update tasks on one screen. Alternatively or in addition to the above, some of the embodiments facilitate system reconfigurations, which may be beneficial upon the change of requirements, to enable the disclosed methods and apparatus to satisfy the new monitoring requirements.

A few inventive aspects of these embodiments are summarized in more detail below. However, the below summary of inventive aspects is merely provided for exemplary purposes, and is not intended as an exhaustive listing of separate inventive aspects or a complete explanation of all features of the listed inventive aspects. For example, the below summary categorizes some of the inventive aspects as follows: 1) Workbook Monitoring with Integrated Data Entry/Update; 2) Program Outcomes Portal (POP) Monitoring with Integrated Data Entry/Update; and 3) Event and Event Schedule Builder. However, these categorizations are merely provided for exemplary purposes, and are not intended to be limiting. For example, some of the disclosed embodiments may not necessarily be amenable to being categorized in only one of these contexts; e.g., some embodiments can be categorized in multiple of these contexts, while other embodiments may not be categorized in any of these contexts.

I. Overview

Some embodiments are directed to a computer program for facilitating management and processing of data relating to changing conditions of multiple subjects involved in a government-sponsored social program. The computer program is configured for implementation by a processor to display multiple subjects, which form a group of subjects involved in the government-sponsored social program, in one of a column and row format. Multiple requirements, which each are required to be satisfied within a certain deadline pursuant to the government-sponsored social program, are displayed in the other of the column and row format, such that the displayed multiple subjects and multiple requirements form a matrix. One of multiple identifiers, which are displayed at each of the intersections of the matrix, each indicate status of the requirement relevant to the associated subject, each of the multiple identifiers being visually unique to enable identification of the relevant status. The program is configured to enable additional data to be entered relating to one of the subjects, requirements and status indications upon selection of the corresponding identifier.

Some embodiments are directed to a non-transitory computer-readable storage medium that stores a computer program for facilitating management and processing of data relating to changing conditions of multiple subjects involved in a government-sponsored social program. The computer program including instructions that, when executed on a computer, cause the computer to perform a series of operations, including displaying multiple subjects, which form a group of subjects involved in the government-sponsored social program, in one of a column and row format. Multiple requirements, which each are required to be satisfied within a certain deadline pursuant to the government-sponsored social program, are displayed in the other of the column and row format, such that the displayed multiple subjects and multiple requirements form a matrix. One of multiple identifiers, which are displayed at each of the intersections of the matrix, each indicate status of the requirement relevant to the associated subject, each of the multiple identifiers being visually unique to enable identification of the relevant status. The program is configured to enable additional data to be entered relating to one of the subjects, requirements and status indications upon selection of the corresponding identifier.

II. Workbook Monitoring with Integrated Data Entry/Update

Some of the disclosed embodiments enable a user, such as a manager, to monitor or otherwise determine whether the status of any event of any client in any group of clients is current, or alternatively whether the associated deadline is approaching or past due. In some embodiments, the grouping of clients can be constituted as a caseload, classroom, or any customized group. However, embodiments are intended to be applied in the context of any other groupings of clients.

Some embodiments uniquely represent the different status indications, such as via a display, using unique identifiers. For example, a green flag can be used to represent any current event, a yellow flag for an upcoming event or deadline (i.e., impending deadline), a red flag for any past due event, a blue flag for an past due but remedied event, etc. However, these identifiers are merely provided for exemplary purposes, and embodiments are intended to include or otherwise cover any type, configuration, and/or color of identifier that enables easy, effective, efficient, and/or quick status identification.

In accordance with some embodiments, a user can select a certain identifier, such as a flag, to enable the performance of various operations. For example, selecting an identifier may provide access to a certain form for entering corresponding data. In some embodiments, this identification opens a form that is related to the selected status and/or event, which facilitates user friendliness of the system.

A. Monitoring

In accordance with some embodiments, a screen is displayed for a user providing the user's caseload, such as a caseload including a certain number of children. A certain identifier, such as a green flag, can be used to indicate that health events for a certain child are current or up to date, while another distinguishable identifier, such as a red flag, can be used to indicate past due events. A different identifier, such as a yellow flag, can be used to indicate events with impending deadlines, such as events that are due within 30 days of her enrollment into HS program.

This screen, which can be referred to as a Workbook screen, is beneficial because it provides the user (such as a HS manager) with a real time monitoring capability, which enables the manager to identify the overall status of all children in the caseload (or any other group) at a glance. The HS manager can thereby recognize that most of the caseload is current, while about 10% of the events are past due, and the deadlines for a few events are approaching. The screen can be used for other purposes, such as by being exported out to a PDF file, printed as communication is needed, etc.

This screen can provide the user with the ability to change the type of identifiers. As one example, legends with icons can be provided, such that selection of one of the icons determines the type of identifier. For example, icons can be provided to select between: 1) colored flags; 2) grayscale flags; or 3) other grayscale or colored symbols. Users can choose the appropriate icon for personal or situational preferences. For example, the grayscale flags or other symbols may be appropriate for printing the screen to a black-and-white printer, while colored flags or other symbols may be appropriate for printing to a color printer.

B. Integrated Data Entry/Update

Some of the above embodiments enable a user (such as an HS manager) to update or enter new data in order to update a child's status for an event. For example, a user (such as a HS manager) may recognize that a certain child has had Medicaid in place since a certain date, but failed to update the system. The user is able to obtain this information by disposing the cursor at the red flag of the event at issue, e.g., Medical Insurance. For example, disposing the cursor on or in the vicinity of the red flag at issue provides the user with relevant information, such as the fact that Medicaid has been in place for this child since a certain date, but the system has erroneously not been updated.

The system is then configured to enable the HS manager to select the red flag under the Medical Insurance column for this child, for the purpose of updating or entering new data. Upon such a selection, the system is configured to open up a data entry form for the HS manager to enable the HS manager to enter the missing data. The HS manager is then provided with the opportunity to enter the appropriate data, i.e., Medicaid effective at a certain date, and to then close the data form.

The system is configured to automatically update the Workbook monitoring screen. For example, the screen can be updated to show that the child's Medical Insurance event is now current as indicated by a new green flag.

In accordance with some embodiments, the methods and systems are configured to enable users to receive alerts, such as via any medium including but not limited to email, text messaging, SMS, etc., depending on the status. For example, these alerts can be transmitted and/or received if certain deadlines are approaching ("coming soon") and/or missed ("past due"). Some of these or other embodiments enable the alerts to be transmitted and/or received at predetermined intervals, such as daily, weekly, or monthly. Some of the Emails sent to users are automatically documented.

In accordance with some of the above and/or other embodiments, methods and systems are configured to enable users, such as administrators, to customize the Workbook, such as to display or not display certain columns and/or other information, including information relevant to the alerts discussed above. In some embodiments, certain users, such as administrators and/or managers, can determine the events to be monitored and/or the recipients of certain information, such as the recipients of the event alerts for events with impending deadlines or deadlines that are past due.

A setting button can be provided to allow administrators and/or managers to set: 1) the events to be monitored; and 2) the recipients of the event alerts for events with impending deadlines or deadlines that are past due. For example, the system can be configured to enable the users (or only certain users) to select the setting button.

Selection of the setting button results in a display of a list of all events that can be monitored. The user is then provided with the ability to determine the events to be monitored or not monitored. For example, a box can be provided adjacent to each event. Selecting the box results in the adjacent event being monitored, while not selecting the box results in the adjacent event not being monitored. The selection can be made via a check mark, which can be added or removed by selecting the box with the cursor. The users are thereby enabled to select or deselect an event.

As indicated above, in addition or as an alternative to determining the events to be monitored, some systems are configured to enable the user to determine the recipient of certain or all alerts, and/or the amount of information provided to certain recipients. As one example, the system can be configured to enable certain users (such as administrators) to manipulate certain settings to determine which user groups receive which alerts, whether the alert(s) should include a detailed participants listing, etc.

In accordance with some embodiments, alert settings can be manipulated by the user. For example, all users in a certain user group can be designated to receive alerts on certain events, such as "Developmental Assessment" and "Physical Exam" with detailed participants listings.

However, the methods and systems of other embodiments can be configured in other ways to provide access to certain amounts of data depending of the user. For example, some systems and methods may automatically show/hide certain rows or columns (or certain data in certain rows and/or columns) based on each user's level of access.

Some embodiments are configured to control user access using a two-dimensional structure, including organizational access and content access. The organizational access dimension determines which part of the organizational tree the user can access. The content access dimension determines what content/information the user can access. For example, both user A and user B can access the "Physical Exam" content, which is an example of the content access dimension. However, user A's organizational access is limited to Center A, while user B's organizational access is not limited to Center B, which is an example of the organizational access dimension. Therefore, user A can only access children's "Physical Exam" content/event in Center A, but not Center B's children. However, user B can access children's "Physical Exam" content/event in both centers A and B.

Some aspects of these embodiments are discussed in more detail below in the context of the following Program Outcomes Portal (POP) section.

III. Program Outcomes Portal (POP) Monitoring with Integrated Data Entry/Update

In accordance with some embodiments, the systems and methods are configured to enable some users, such as agency managers, to monitor the above and/or other operations on a real time or substantially real time basis, such as on a more macro level. This feature enables users to identify/update or otherwise determine a number of aspects of the data, including but not limited to: 1) events that are current, and/or deadlines that are approaching, or past due, such as on the agency level; and 2) the status of each business process. In addition, these users can perform data entry or update information on a participant's data form. This integration of data entry with monitoring applies to the classroom level as well as to the macro level.

Some embodiments uniquely represent the different status indications, such as via a display, using the unique identifiers disclosed above. For example, as in the above examples, a green flag can be used to represent any current event, a yellow flag for an upcoming event or deadline, a red flag for any past due event, and a blue flag for a past due but remedied event.

This feature can be used or otherwise applied in any beneficial context, such as in contexts other than the caseload contexts disclosed above. This feature can be used with Federal/Local Mandates, EPSDT, Immunization, ERSEA, Mental Health, Dental Health, Physical/Medical Tests, Medical Conditions, Nutrition, Disability, CLASS, and/or Staff (Check List, Training, Education, Certification/Licenses).

In one example, a user, such as a HS manager, can quickly gather important program information, such as but not limited to information relating to the enrolled participants of the entire agency. The user can easily determine the rough percentage of the participants that are current, approaching deadlines, past due, and remedied past due dates. The mandatory events are grouped by the length of the "grace period," such as 30-day, 45-day, and 90-day grace periods. These "grace periods" are determined by the federal government, state government, and agency, and can be configured by the agency, which is discussed in more detail in the context of Events and Events Schedule Builder. In other words, for each of the events discussed above, the screen provides a breakdown for all of the participants within a certain group.

This feature can be implemented using any operations. For example, in accordance with some embodiments, a user can select any of the numbers displayed on the Program Outcomes Portal (POP), such as any of the numbers displayed adjacent to any of the flags discussed above. This selection enables the user to obtain access to a detailed clients listing for that category, such as all reds flags for Medical Home.

The methods and systems of some embodiments are configured to enable a user to obtain breakdowns of some or all of the above information in the contexts of different levels of the overall structure of the organization. For example, the user can obtain breakdowns of the data by the agency organization structure from the top, delegate (subcontractor), centers to classrooms and caseloads.

In accordance with some embodiments, this operation is performed by selecting the [+] symbol adjacent the desired type of information. The system allows users to break down any of these agency level numbers by the agency's organizational structure. Specifically, if a user selects the [+] symbol adjacent the Medical Home category, a display is provided in which the relevant numbers are distributed among the agency's delegate, locations (centers), and classrooms.

In accordance with some embodiments, the methods and systems are configured to provide access to certain amounts of this data. Thus, the methods and systems of some embodiments are configured to enable a user, such as an administrator, to customize the POP to show or hide certain columns.

In some embodiments, this operation is performed by selecting a [Setting] button. Thus, users, such as administrators, can select the checkbox to show or hide a category, and click the up/down arrows to control the display order.

In accordance with some embodiments, the methods and systems are configured to enable users to receive alerts, such as via any medium including but not limited to email, text messaging, SMS, etc., depending on the status. For example, these alerts can be transmitted and/or received if certain deadlines are approaching ("coming soon") and/or missed ("Past due"). Some of these or other embodiments enable the alerts to be transmitted and/or received at predetermined intervals, such as daily, weekly, or monthly.

Some of the alerts sent by email to users are automatically documented in the system. The determination as to which user groups receive alerts is initiated by selecting an [Alert] button to pop up a window. The administrator can determine which user groups receive alerts on which categories of events, and whether to receive the detailed listing.

In accordance with some embodiments, the methods and systems are configured to provide access to certain amounts of data depending on the user. For example, the systems and methods may automatically show/hide certain rows or columns (or certain data in certain rows and/or columns) based on each user's level of access.

The system controls user access using a two-dimensional structure, including organizational access and content access. The organizational access dimension determines which part of the organizational tree the user can access. The content access dimension determines what content/information the user can access. For example, both user A and user B can access the "Physical Exam" content. However, user A's organizational access is limited to the Center B while user A's organizational access is limited to the Center B. Therefore user A can only access children's "Physical Exam" content/event in Center A, but not Center B's children. Also, vice versa, user B can only access children's "Physical Exam" content/event in Center B, but not Center A's children.

IV. Event and Event Schedule Builder

In accordance with some embodiments, the systems and methods are configured to enable users to build their own events and event schedulers. In some of these embodiments, the event includes a series of occurrences, and an event scheduler includes a set of events.

In some of these embodiments, each event is linked to a set of data entry forms. A date field on the form is checked to determine whether the form meets the event occurrence's requirement. This operation can be performed by determining whether the data field falls between the event occurrences' acceptable or catch-up data range. The acceptable or catch-up data range is calculated based on either the previous occurrence or the client age depending on how the agency's system administrator configures the event.

One embodiment of the event scheduler is the EPSDT (The Early and Periodic Screening, Diagnostic, and Treatment) schedule, which differs from state to state. Agency administrators can set up their own event schedule to meet the local requirement.

The Event Engine in the system's software plays the role in transforming family data into an easy to read and understand format, such as the POP, EPSDT and family event viewer based on the business rules defined by the event builder. In some embodiments, the Event Engine constitutes the core technology of the system's software for transforming family data into information that can be monitored. The Event Engine transforms family data based the rules set up in the Event Builder, including but not limited to:

(1) The event due grace period, e.g., 45 days of the Effective Date;
(2) Effective date can be participant's program enrollment date, first day of service, etc.;
(3) Reoccurrence due grace period, e.g., 7 days;
(4) Anchor date can be participant's DOB, program enrollment date, etc.;
(5) Applicable age range and programs;
(6) Properties of Occurrence
 a. Required or option;
 b. Due date;
 c. Catch up period.

While POP and Workbook provide a user, such as a HS manager, an overview of the information that is beneficial to high level management decisions and data update, the Event Viewer and EPSDT are two examples of how the transformed data are presented on an individual participant's level (say a child or a family).

BRIEF DESCRIPTION OF THE DRAWINGS

The disclosed subject matter of the present application will now be described in more detail with reference to exemplary embodiments of the apparatus and methods, given by way of example, and with reference to the accompanying drawings, in which:

FIG. 2 is a schematic of a screen showing a caseload with eleven children in accordance with an exemplary embodiment;

FIG. 3 is a schematic of a portion of the screen of FIG. 2, showing the user's ability to update or enter new data;

FIG. 4 is schematic of a screen showing the user's ability to update or provide further information relevant to the selected identifier of FIG. 3;

FIG. 5 is a schematic of a screen that has been updated pursuant to the information entered via the screen of FIG. 4;

FIG. 6 is a schematic of a screen showing the user's ability to customize the information displayed and/or the events to be monitored;

FIG. 7 is a schematic of a screen showing the user's ability to determine the recipient of certain or all alerts, and/or the amount of information provided to certain recipients;

FIG. 8 is a schematic of an exemplary screen in the context of ERSEA Recruitment;

FIG. 9 is a schematic of an exemplary screen in the context of ERSEA Enrollment;

FIG. 11 is a schematic of an exemplary screen in the context of Mental Health;

FIG. 12 is a schematic of an exemplary screen in the context of Immunization;

FIG. 14 is a schematic of an exemplary screen in the context of Mandates for Head Start;

FIG. 15 is a schematic of a screen displayed subsequent to selection of a certain category from FIG. 14;

FIG. 16 is a schematic of a screen displayed upon selection of a [Go] button from FIG. 15;

FIG. 17 is a schematic of an exemplary screen in the context of Mandates for Head Start, which is a refreshed version of the screen of FIG. 14;

FIG. 20 is a schematic of a screen that enables users to determine which user groups receive alerts;

FIG. 21 is a schematic of a screen that shows how the content dimension is controlled;

FIG. 22 is a schematic of a screen that shows how the organization dimension is controlled;

FIG. 23 is a schematic of a screen that provides details as to how users, such as system administrators, can design an event using the event builder;

FIG. 26 is a schematic of a screen that illustrates a child's EPSDT schedule; and FIG. 27 is a schematic of a screen that illustrates a child's event viewer;

DETAILED DESCRIPTION

Figure 1:
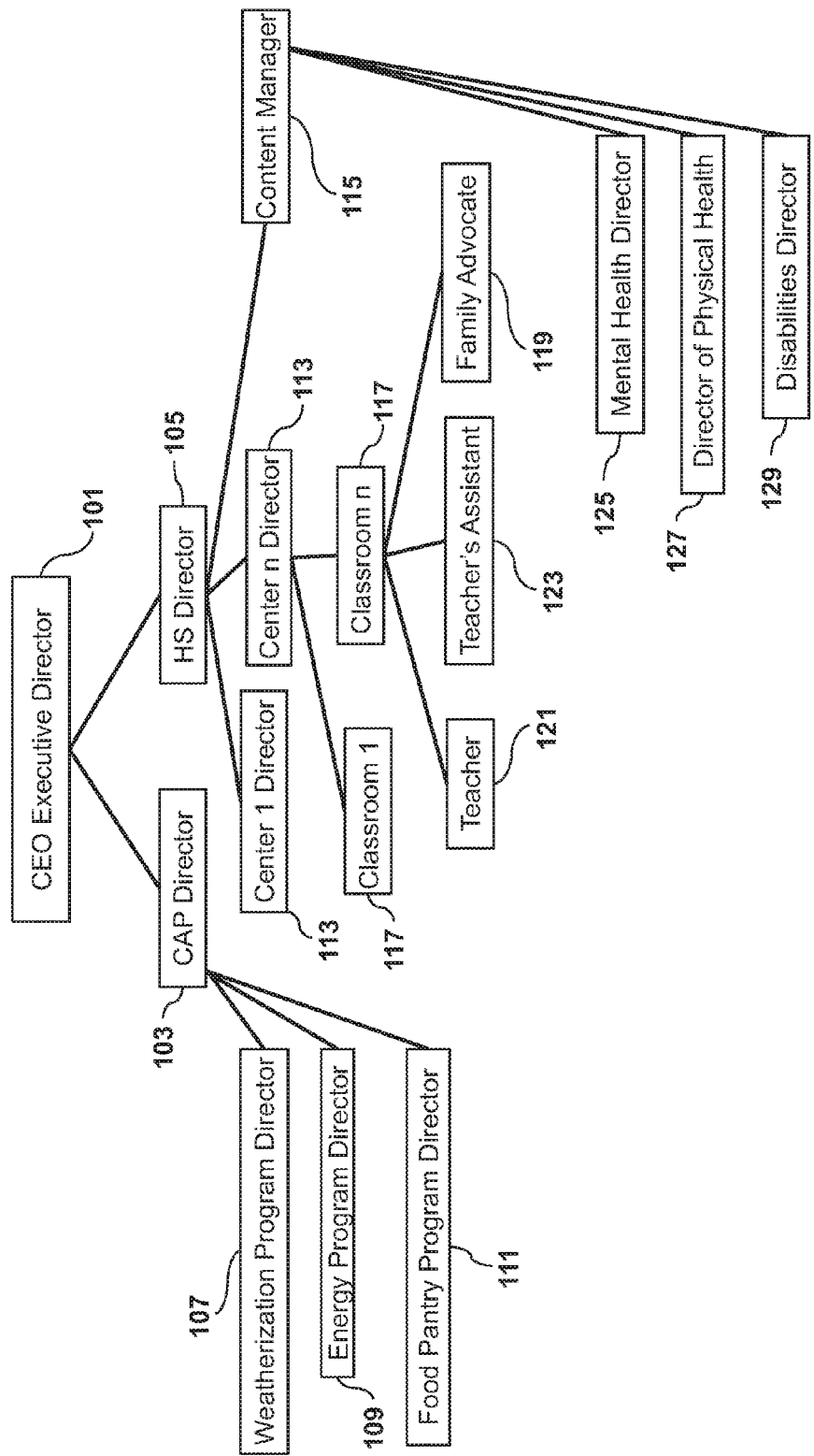
FIG. 1 is a schematic of a typical structure of a HS/CAP organization.

A few inventive aspects of the disclosed embodiments are explained in detail below with reference to the various figures. This disclosure is provided in the contexts of: 1) Workbook Monitoring with Integrated Data Entry/Update; 2) Program Outcomes Portal (POP) Monitoring with Integrated Data Entry/Update; and 3) Event and Event Schedule Builder. However, as indicated above, these categorizations are merely provided for exemplary purposes, and are not intended to be limiting. For example, some of the disclosed embodiments may not necessary be amenable to being categorized in only one of these contexts; e.g., some embodiments can be categorized in multiple of these contexts, while other embodiments may not be categorized in any of these contexts.

The following disclosure refers to certain colors, typically in the context of colored identifiers displayed on a color display, and/or printed using a color printer. Using different identifiers can be advantageous because it enables a user to easily distinguish between the different colored identifiers. The colors that are referred to in various sections of the present disclosure include green, yellow, red, and blue. However, these colors are merely referred to for convenience, and similar or completely different colors can be used. In fact, not all embodiments base distinctiveness based solely or in part on color differences. For example, the attached figures do not show the identifiers in color, and instead the identifiers are provided in black and white, which may be beneficial under certain circumstances, such as when printing using a black and white printer. Thus, in the context of these identifiers, green is shown as grey, yellow is shown as white, red is shown as black, and blue is shown as cross-hatching.

I. Workbook Monitoring with Integrated Data Entry/Update

Some of the disclosed embodiments enable a user to monitor or otherwise determine whether the status of any event of any client in any group of clients is current, or alternatively whether the associated deadline is approaching, past due, etc. Some embodiments uniquely represent the different status indications, such as via a display, using unique identifiers. For example, a green flag can be used to represent any current event, a yellow flag for an upcoming event or deadline (i.e., impending deadline), a red flag for any past due event, a blue flag for an past due but remedied event, etc. However, these identifiers are merely provided for exemplary purposes, and embodiments are intended to include or otherwise cover any type, configuration, and/or color of identifier that enables easy, effective, efficient, and/or quick status identification.

In fact, some embodiments do not distinguish between different identifiers based on color, and instead make this distinction based on identifiers of different shapes and/or sizes. In some of these embodiments, different but related conditions can be identified with slightly different identifiers, while extremely different conditions can be identified with very different identifiers. This gradation in identifiers are can be expressed in terms of different colors and/or different shapes, sizes, etc. In fact, identifiers can be different in terms of shape, size and/or color.

The identifiers can be used in ways other than or in addition to the visual monitoring disclosed above. For example, a user may also select a certain identifier, such as a flag, to enable the performance of various operations. In some of these embodiments, selecting an identifier may provide access to a certain form for entering corresponding data. In some such embodiments, this identification opens a form that is related to the selected status and/or event, which facilitates user friendliness of the system.

A. Monitoring

FIG. 2 is a schematic of a screen showing a caseload with thirteen children in accordance with an exemplary embodiment, such as one of the embodiments disclosed above. The children's names are listed in the first column labelled Participants 201. As indicated in FIG. 2, for the first child, Andrew Bellamy 203, black (red) flags are provided in the columns Medical Insurance, Dental Home, Mental Health, Dental and EPSDT, indicating that these events have passed the due date which is 30 days of her enrollment into the HS program. All other events except Immunization are current as indicated by a white (green) flag. For the eighth child, Carrie Dyson 205, the deadlines for her Medical Insurance and Dental Home coming soon as indicated by grey (yellow) flags.

The bottom of FIG. 2 includes a key of three different exemplary types of identifiers. The top row includes colored flags, the middle row grayscale flags, and the bottom row different colored symbols. These different types of identifiers are merely provided for exemplary purposes, and embodiments are intended to include any type, size, color, etc. of identifiers that enable the user to distinguish between them.

The screen shown in FIG. 2, which may be referred to as a Workbook screen, is beneficial in various respects. For example, the configurations discussed above, such as the distinguishable identifiers, provide the user (such as a HS manager) with a real time monitoring capability. The HS managers can thereby easily identify the overall status of all children in the caseload (or any other group) at a glance. The HS managers can easily recognize, by quickly viewing the Workbook screen, that most of the caseload has deadlines approaching, while about 10% of the events are past due, and the deadlines for a few events are current.

Thus, some embodiments utilize the screen visually on a display, such as to provide the user with the ability to easily obtain an overall understanding of the caseload. However, some of these and other embodiments use the distinguishable identifiers in other ways to achieve the same, similar, and/or other benefits. In some of these embodiments, the screen can be exported out to a PDF file, printed, or manipulated or changed to any other medium for any beneficial purpose.

B. Integrated Data Entry/Update

Some of the above embodiments enable a user (such as an HS manager) to update or enter new data in order to update a child's status for an event. This ability is provided via the screen shown in FIG. 2.

FIG. 3 is a schematic of a portion of the screen of FIG. 2, showing the user's ability to obtain further information regarding an event update or enter new data. In accordance with the example shown in FIG. 3, a user (such as a HS manager) may recognize that a certain child, in this case Andrew Bellamy 203, has had Medicaid in place since Sep. 5, 2013, but failed to update the system. In the example shown in FIG. 3, the user is able to obtain this information by disposing the cursor 301 at the black flag 303 of the event at issue, i.e., Medical Insurance. For example, disposing the cursor 301 on or in the vicinity of the black flag 303 at issue provides the user with relevant information 305, such as the fact that Medicaid has been past due.

The system is configured to enable the HS manager to select the black flag 303 under the Medical Insurance 307 column for this child, i.e., Andrew Bellamy 203, for the purpose of updating or entering new data. For example, FIG. 4 is a schematic of a screen showing the user's ability to update or provide further information relevant to the selected identifier of FIG. 3.

As shown in FIG. 4, upon such a selection, the system is configured to open up a data entry form 401 for the HS manager to enable the HS manager to enter the missing data. The HS manager is then provided with the opportunity to enter the appropriate data, i.e., Medicaid effective Sep. 5, 2013, and to then close the data form.

The system is configured to automatically update the Workbook monitoring screen. For example, FIG. 5 is a schematic of a screen that has been updated pursuant to the information entered via the screen of FIG. 4. In other words, the screen of FIG. 5 corresponds to the screen of FIG. 3, but includes the updated information indicated above. Specifically, FIG. 5 shows that Andrew Bellamy's Medical Insurance event is now current as indicated by the new white (green) flag 501.

In accordance with some embodiments, the methods and systems are configured to enable users to receive alerts, such as via any medium including but not limited to email, text messaging, SMS, etc., depending on the status. For example, these alerts can be transmitted and/or received if certain deadlines are approaching ("coming soon") and/or missed ("past due"). Some of these or other embodiments enable the alerts to be transmitted and/or received at predetermined intervals, such as daily, weekly, or monthly. Some of the Emails sent to users are automatically documented.

In accordance with some of the above and/or other embodiments, methods and systems are configured to enable users, such as administrators, to customize the Workbook, such as to display or not display certain columns and/or other information, including information relevant to the alerts discussed above. In some embodiments, certain users, such as administrators and/or managers, can determine the events to be monitored and/or the recipients of certain information, such as the recipients of alerts for events with impending deadlines or deadlines that are past due.

Figure 6:
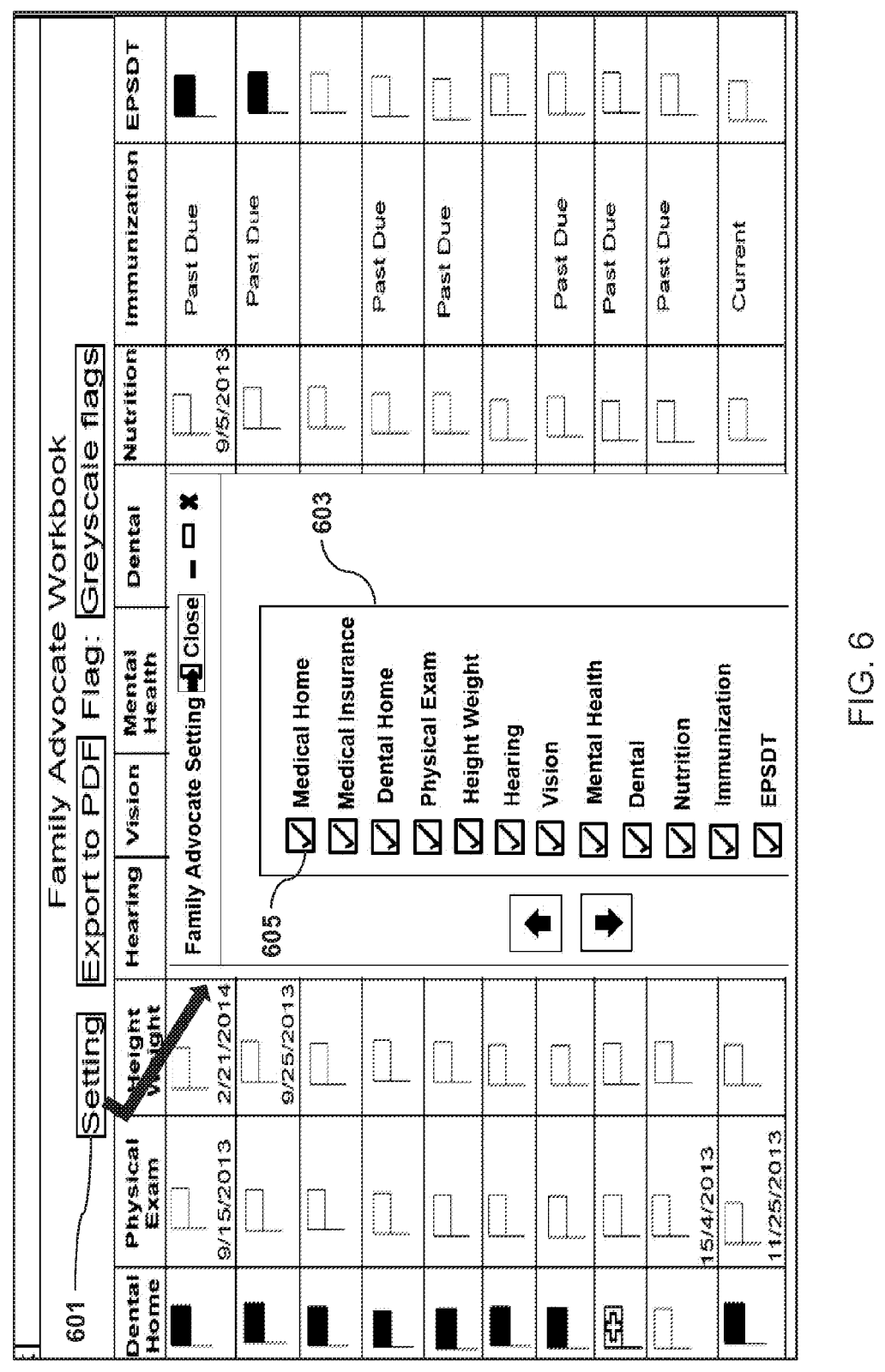

FIG. 6 is a schematic of a screen showing the user's ability to customize the information displayed and/or the events to be monitored. As shown in FIG. 6, a setting button 601 allows administrators and/or managers to set: 1) the events to be monitored; and 2) the recipients of the event alerts for events with impending deadlines or deadlines that are past due. In other words, the system is configured to enable the users (or only certain users) to customize the system by determining the events to be monitored and/or the recipients of alerts, by selecting select the setting button 601.

In the embodiment shown in FIG. 6, selection of the setting button 601 results in a display of a list of all events 603 that can be monitored. The user is then provided with the ability to determine the events to be monitored or not monitored. For example, in the embodiment shown in FIG. 6, a box 605 is provided adjacent to each event. Providing a check mark in the box 605 results in the adjacent event being monitored, while leaving the box 605 without a check mark results in the adjacent event not being monitored. The check mark can be added or removed by selecting the box with the cursor. The users are thereby enabled to select or deselect an event.

As indicated above, in addition or as an alternative to determining the events to be monitored, some systems are configured to enable the user to determine the recipient of certain or all alerts, and/or the amount of information provided to certain recipients. As one example, the system can be configured to enable certain users (such as administrators) to manipulate certain settings to determine which user groups receive which alerts, whether the alert(s) should include a detailed participants listing, etc.

FIG. 7 is a schematic of a screen showing the user's ability to determine the recipient of certain or all alerts, and/or the amount of information provided to certain recipients. In other words, FIG. 7 shows one example of alert settings that can be manipulated by the user. In the example shown in FIG. 7, as indicated by the "yes" under the display participants listing 707, all users in the FSW user group 701 are designated to receive alerts on the following events: "Developmental Assessment" 703; and "Physical Exam" 705.

However, the methods and systems of other embodiments can be configured in other ways to provide access to certain amounts of data depending of the user. For example, some systems and methods may automatically show/hide certain rows or columns (or certain data in certain rows and/or columns) based on each user's level of access.

Some embodiments are configured to control user access using a two-dimensional structure, including organizational access and content access. The organizational access dimension determines which part of the organizational tree the user can access. The content access dimension determines what content/information the user can access. For example, both user A and user B can access the "Physical Exam" content, which is an example of the content access dimension. However, user A's organizational access is limited to Center A, while user B's organizational access is not limited to Center B, which is an example of the organizational access dimension. Therefore user A can only access children's "Physical Exam" content/event in Center A, but not Center B's children. However, user B can access children's "Physical Exam" content/event in both centers A and B are.

Some aspects of these embodiments are discussed in more detail below in the context of the following Program Outcomes Portal (POP) section.

II. Program Outcomes Portal (POP) Monitoring with Integrated Data Entry/Update

In accordance with some embodiments, the systems and methods are configured to enable some users, such as agency managers, to monitor the above and/or other operations on a real time or substantially real time basis, such as on a more macro level. This feature enables users to identify/update or otherwise determine a number of aspects of the data, including but not limited to: 1) events that are current, and/or deadlines that are approaching, or past due, such as on the agency level; and 2) the status of each business process. In addition, these users can perform data entry or update information on a participant's data form.

Some embodiments uniquely represent the different status indications, such as via a display, using the unique identifiers disclosed above. For example, as in the above examples, a green flag can be used to represent any current event, a yellow flag for an upcoming event or deadline, a red flag for any past due event, and a blue flag for a past due but remedied event.

This feature can be used or otherwise applied in any beneficial context, such as in contexts other than the caseload contexts disclosed above. This feature can be used with Federal/Local Mandates, EPSDT, Immunization, ERSEA, Mental Health, Dental Health, Physical/Medical Tests, Medical Conditions, Nutrition, Disability, CLASS, and/or Staff (Check List, Training, Education, Certification/Licenses). A few such applications of these contexts are disclosed below.

FIG. 8 is a schematic of an exemplary screen in the context of ERSEA Recruitment. As shown in FIG. 8, this POP shows the family recruitment efforts in the current and past months since the beginning of the program year. The display provides data corresponding to the numbers of families or children relevant to (1) different programs statuses 801, i.e., Applied, Waiting, Accepted and Withdrawn status; (2) IEP/IFSP 803; (3) each age range 805; and (4) each eligibility category 807. This feature may be beneficial for various reasons, such as by enabling agencies to easily determine whether they have a large enough number of families on the Waiting list to satisfy future capacity requirements. If not, then the agency can use this information to plan and perform a coordinated recruitment effort.

FIG. 9 is a schematic of an exemplary screen in the context of ERSEA Enrollment. As shown in FIG. 9, this POP page shows enrollment information for current and past months. For example, this screen shows enrollment 901 by including the number of enrolled families (cumulative and current) as well as the funded slot. This feature may be beneficial for various reasons such as by enabling vacancies or over enrollment to be determined. The number of enrolled children with IEP/IFSP 903 (disabilities) is also displayed. The last column shows the number of families broken down by eligibility categories 905.

Figure 10:
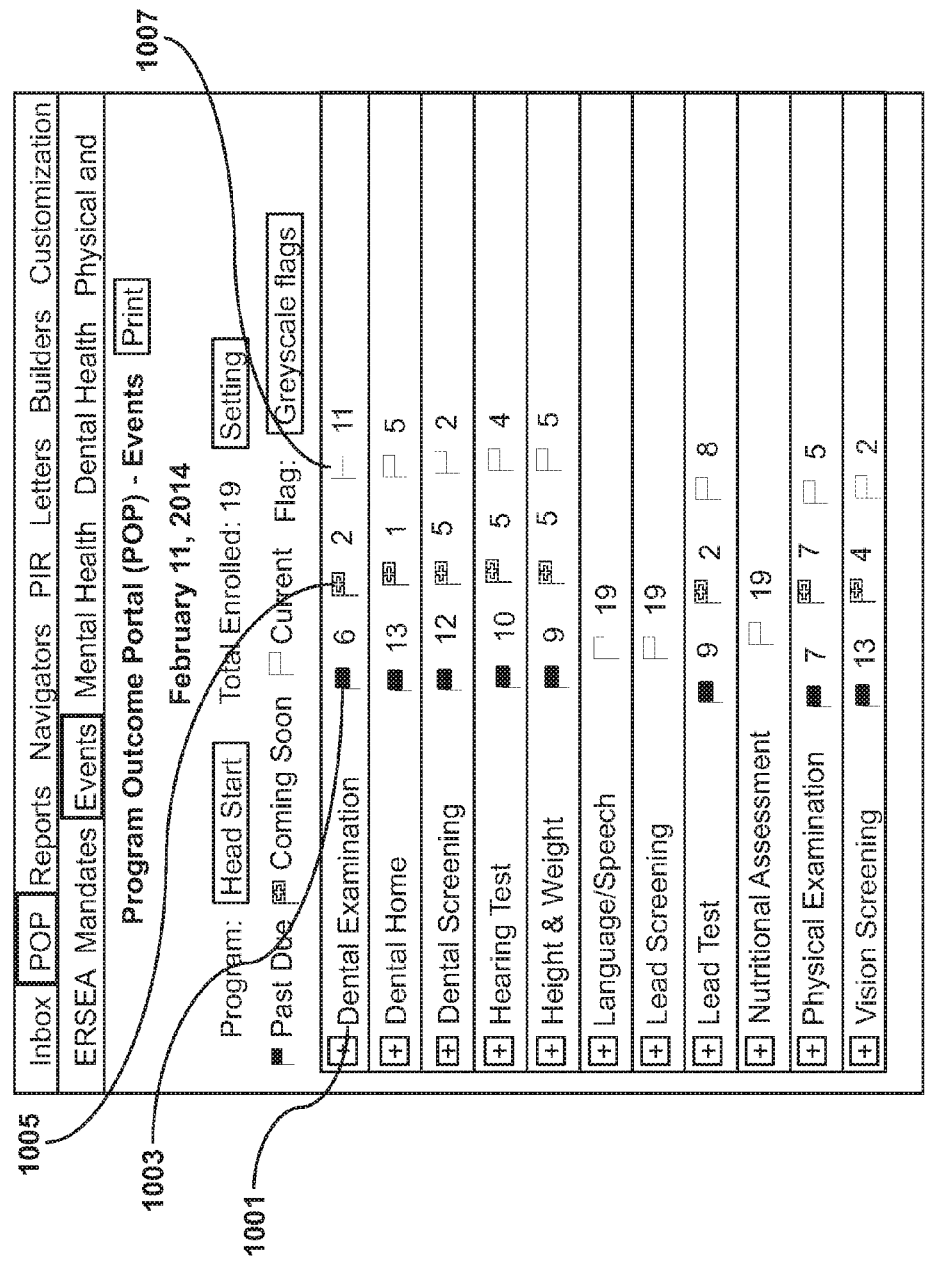
FIG. 10 is a schematic of an exemplary screen for POP Events.

FIG. 10 is a schematic of an exemplary screen for POP Events that provides information on a macro level. As shown in FIG. 10, a user can quickly glance at the each required event to determine the total number of children subject to the status, i.e., "past due," "about to expire," or "current." For example, with regard to dental examination 1001, there are six children who are past due (black/red flag) for a required dental exam 1003, 2 children whose dental exam deadline is approaching (grey/yellow flag) 1005, and 11 children whose dental exam is current (white/green flag) 1007. The user then can click on the flag 1005 with the number 2 to open a pop-up window to see who those 2 children are so the user can coordinate with the families to schedule a dental exam for these 2 children.

FIG. 11 is a schematic of an exemplary screen in the context of Mental Health. FIG. 11 provides the user with information relating to the entire agency's Mental Health Screening effort and the outcome of the effort, including the number of children at each step of the screening process. With regard to the screening result 1101, a user can easily see the number of children who have been screened 1103; among the screened, the number of children do not have a score entered 1105; for those with a score entered 1107 the number in each outcome categories in terms of no concern 1109, reassessment is needed 1111, and referral needed 1113 for a professional evaluation. Among the children who needed a formal assessment 1115, the number of children who have completed the assessment 1117, who has completed a referral 1119, have a service plan in place, and have started receiving professional services.

FIG. 12 is a schematic of an exemplary screen in the context of Immunization. FIG. 12 shows how the children doing in terms of complying with the immunization schedule. Similarly, where the other POPs, this screen helps health managers quickly identify past deadlines and approaching deadlines for immunization events. The results 1201 are shown in columns, which are broken down into separate columns for past due 1203, current 1205, and complete 1207. The first row 1209 shows the overall status, and the subsequent rows show the breakdowns for each immunization event.

Figure 13:
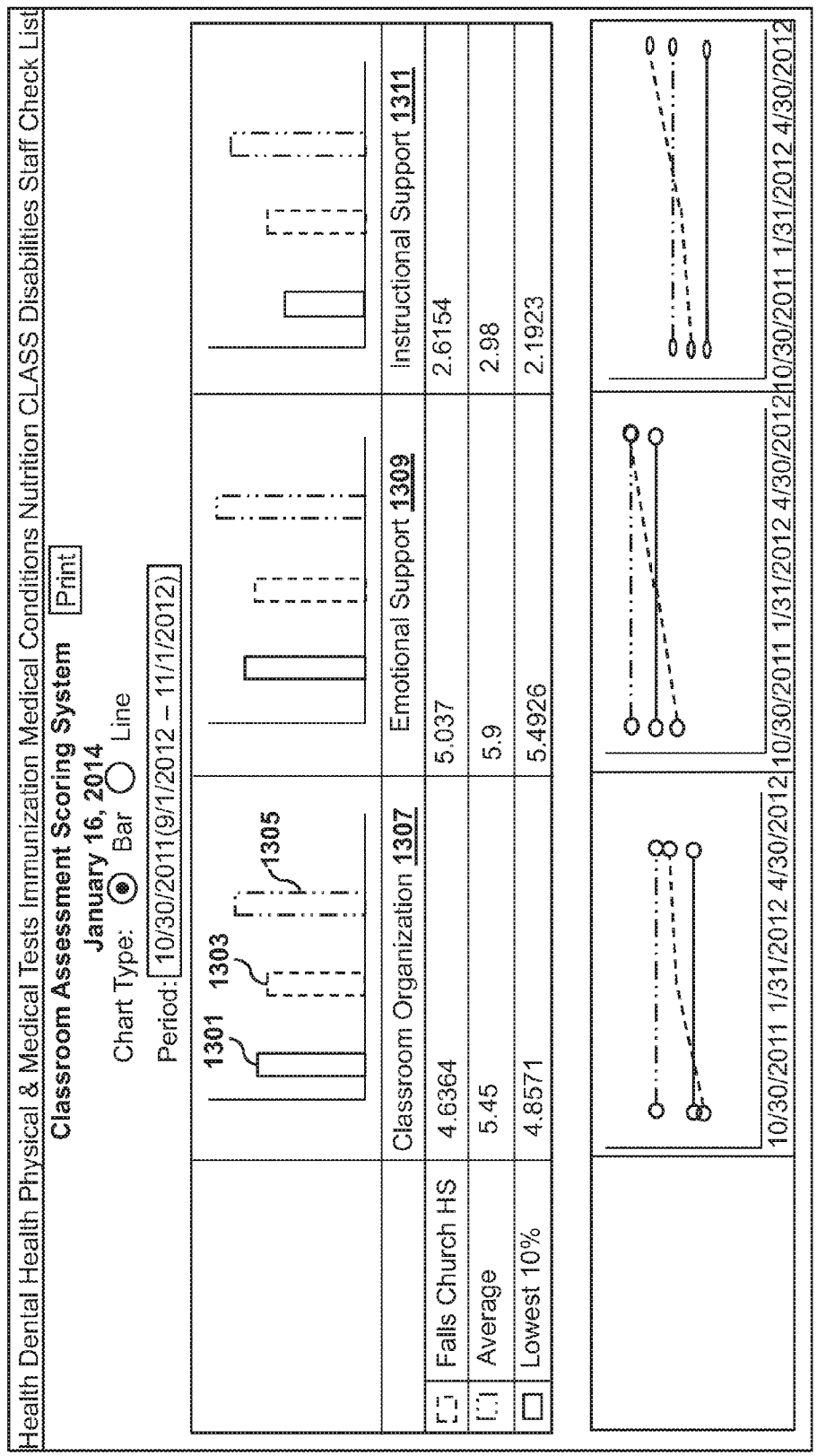
FIG. 13 is a schematic of an exemplary screen in the context of CLASS™.

FIG. 13 is a schematic of an exemplary screen in the context of CLASS™ (classroom assessment scoring system). As shown in FIG. 13, this POP shows how the agency at issue (blue 1303) is comparing with the national lowest 10% (red 1301), and the national average (green 1305). Certain users, such as managers, can also show all three observation points during one program year on a line chart with each node representing an observation point, which is provided at the bottom of the figure. This data can be represented as disclosed above in the contexts of classroom organization 1307, emotional support 1309, and instructional support 1311.

Figure 14:
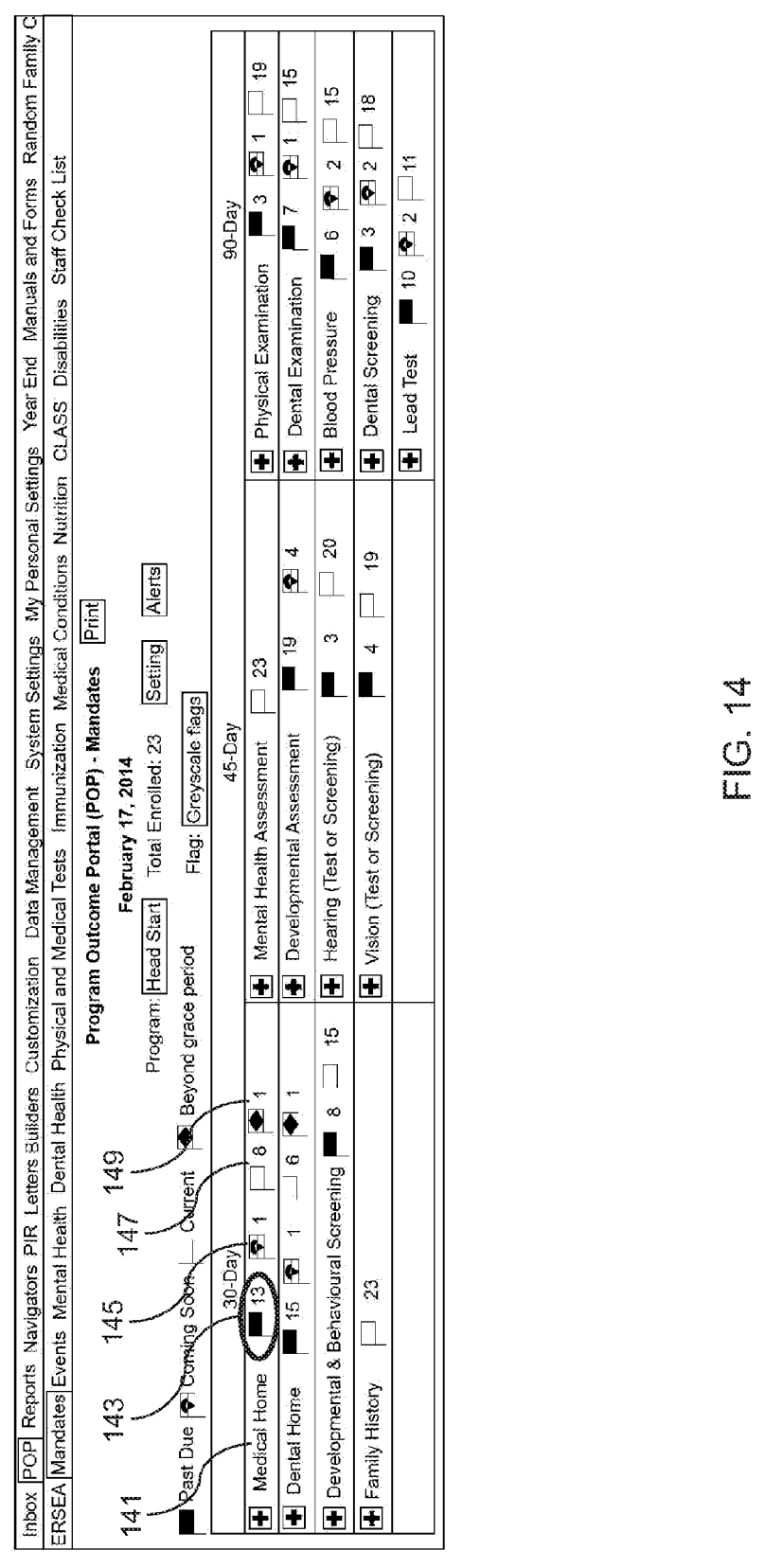

FIG. 14 is a schematic of an exemplary screen in the context of Federal and local Mandates for Head Start. As discussed in more detail below, FIG. 14 is configured to facilitate swift and simple recognition of the information contained therein.

For example, a user, such as a HS manager, can quickly gather important program information, such as but not limited to information relating to the 23 enrolled participants of the entire agency. The user can easily determine the rough percentage of the participants that are current, approaching deadlines, past due, and remedied past due dates. The mandatory events are grouped by the length of the "grace period," such as 30-day, 45-day, and 90-day grace periods. These "grace periods" are determined by the federal government, state government, and agency, and can be configured by the agency, which is discussed in more detail in the context of Events and Events Schedule Builder.

For each of the events discussed above, the POP screen provides a breakdown for all of the participants within a certain group. For example, as shown in FIG. 14, with regard to Medical Home 141, a black (red) flag 143 is indicated for 13 participants, a grey (green) flag 145 is indicated for 1 participant, a white (yellow) flag 147 is indicated for 8 participants, and a cross-hatched (blue) flag 149 is indicated for 1 participant. Thus, with regard to Medical Home, 13 participants are past due, one participant is current, eight participants have impending deadlines, and one participant is remedied past due.

In accordance with some embodiments, a user can select any of the numbers displayed on the Program Outcomes Portal (POP) of FIG. 14, such as any of the numbers displayed adjacent to any of the flags discussed above. This selection enables the user to obtain access to a detailed clients listing for that category, such as all individuals who have red flags for Medical Home. Alternatively, the user can select the flag (instead of the number) to obtain this information.

Figure 15:
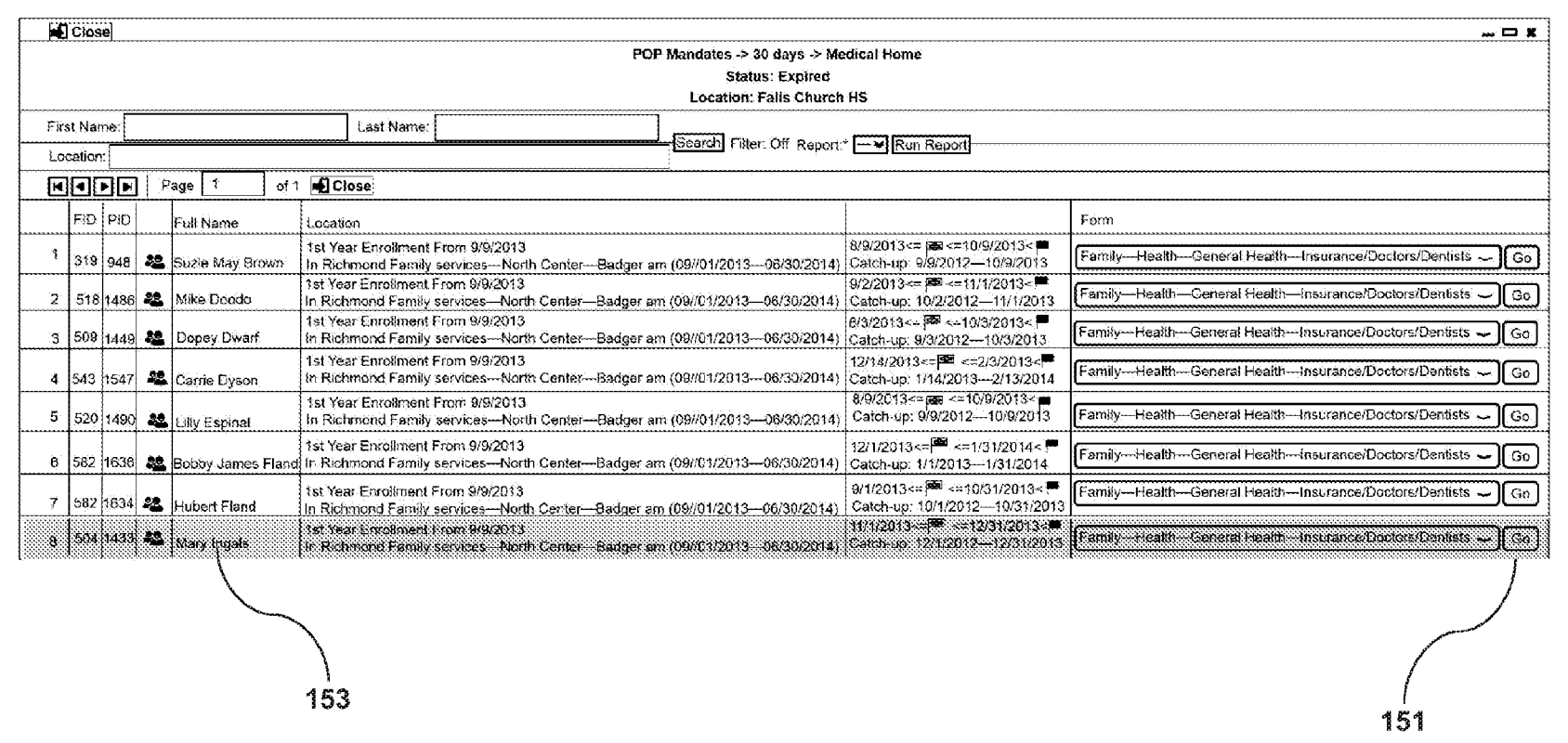

FIG. 15 is a schematic of a screen displayed subsequent to selection of a certain category from FIG. 14. For example, FIG. 15 is displayed subsequent to selection of the black (red) flag (or number adjacent the red flag) of Medical Home from FIG. 14. Specifically, FIG. 15 constitutes a new window that contains a list of 13 children with a black (red) flag in the 30-day Medical Home category after the user clicks the black (red) flag 143 as circled in FIG. 14. The detailed listing window of FIG. 15 enables a user to view all 13 children, their center and classroom, the due date range for the event, and a link to open up the appropriate data entry form. The user may then select the [Go] button 151, such as for child #8, Mary Ingals 153, to obtain access to her Medical Home data entry form.

Figure 16:
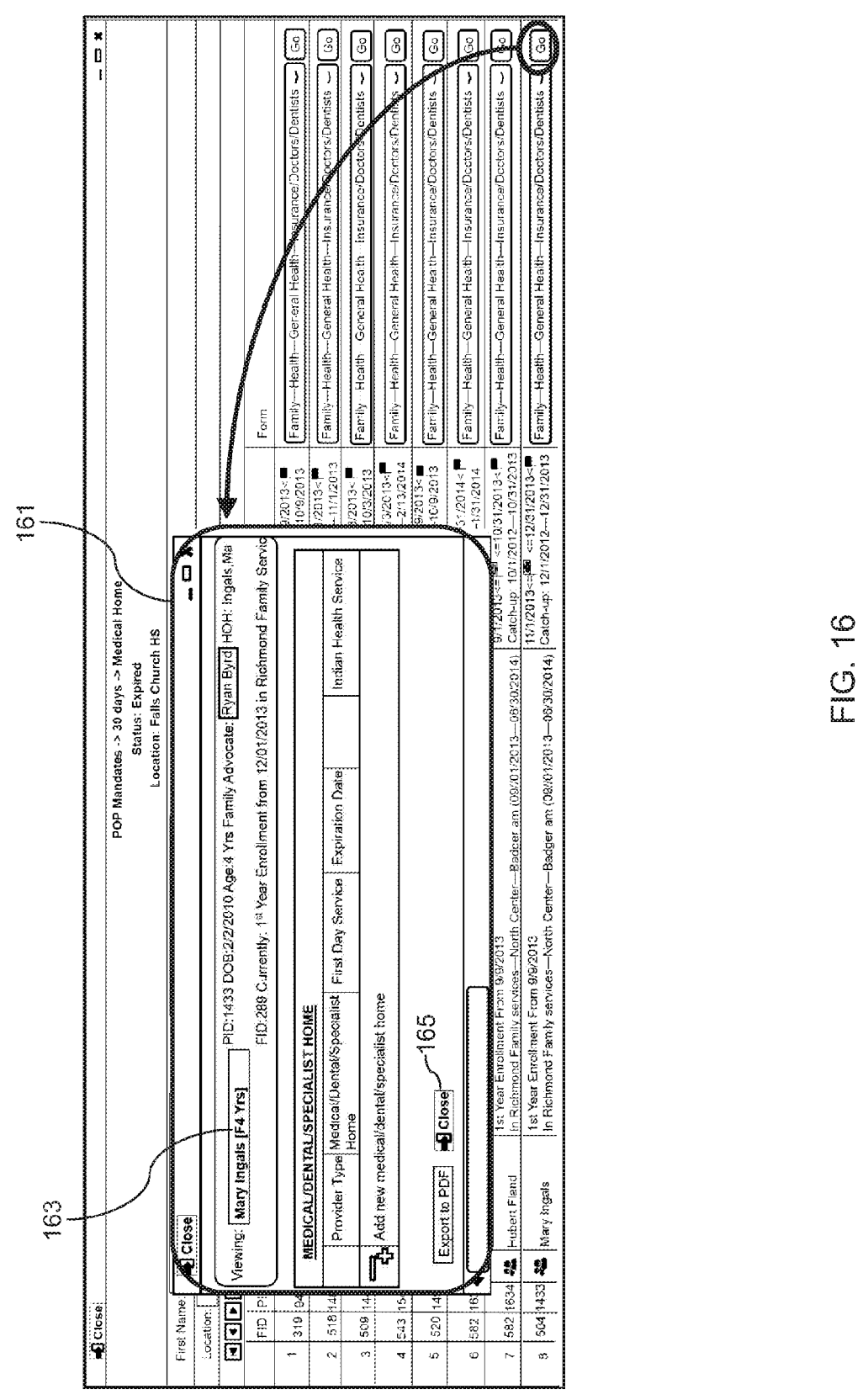

FIG. 16 is a schematic of a screen displayed upon selection of a [Go] button from FIG. 15. As shown in FIG. 16, a widow 161 is displayed that enables the user to enter the Medical Home record for the child Mary Ingals 163, and the user can then close the pop up window by selecting the close icon 165.

Figure 17:
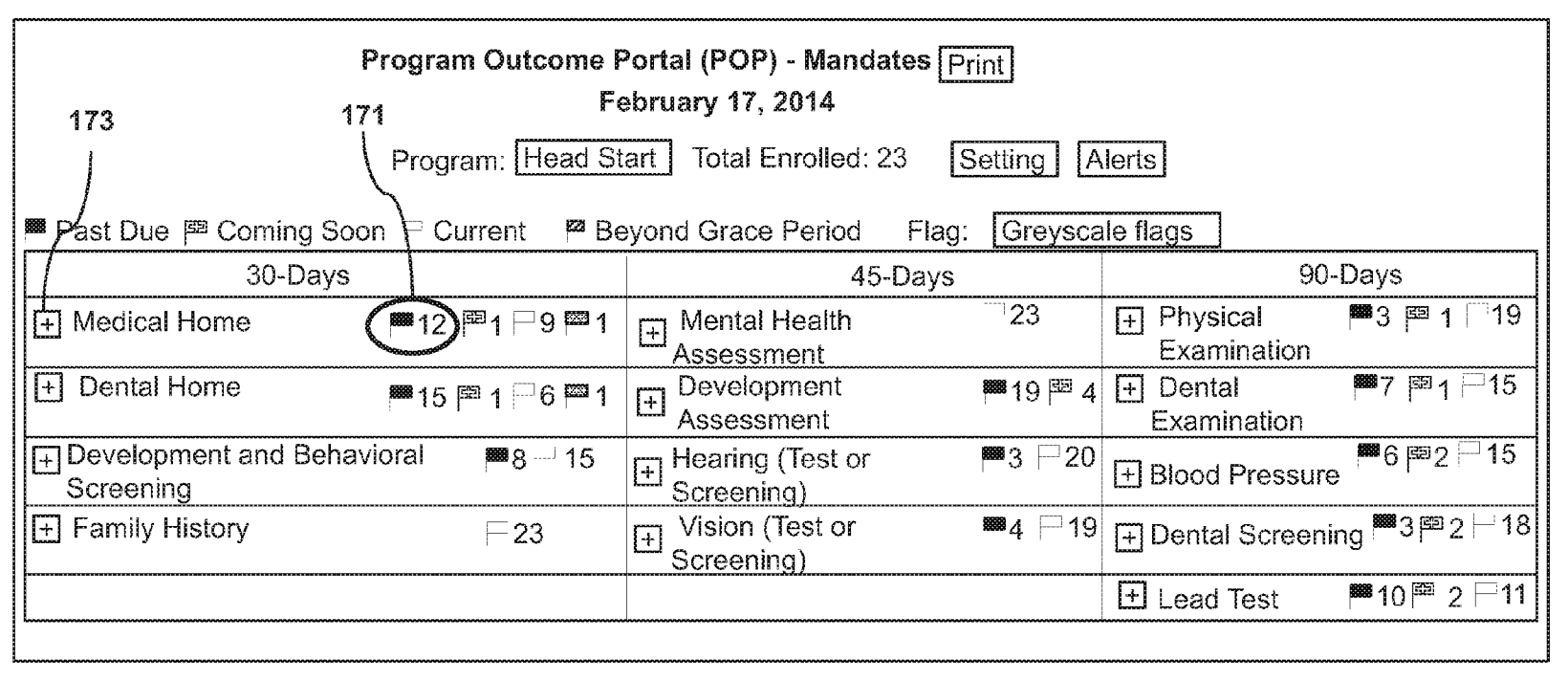

The system is configured so that the POP automatically refreshes its screen to show that there are now only now 12 children left in that category, which in this case are identified via a black (red) flag. FIG. 17 is a schematic of an exemplary screen in the context of Mandates for Head Start, which is a refreshed version of the screen of FIG. 14. Thus, because a medical record has been entered for the child Mary Ingals 163 (as discussed above with regard to FIG. 16), only 12 children remain having black (red) flags 171, as shown in FIG. 17.

The methods and systems of some embodiments are configured to enable a user to obtain breakdowns of some or all of the above information in the contexts of different levels of the overall structure of the organization. For example, the user can obtain breakdowns of the data by the agency organization structure from the top, delegate (subcontractor), centers to classrooms and caseloads. In accordance with some embodiments, this operation is performed by selecting the [+] symbol adjacent the desired type of information. In one example, the [+] symbol 173 adjacent Medical Home in FIG. 17 is selected to perform this operation.

Figure 18:
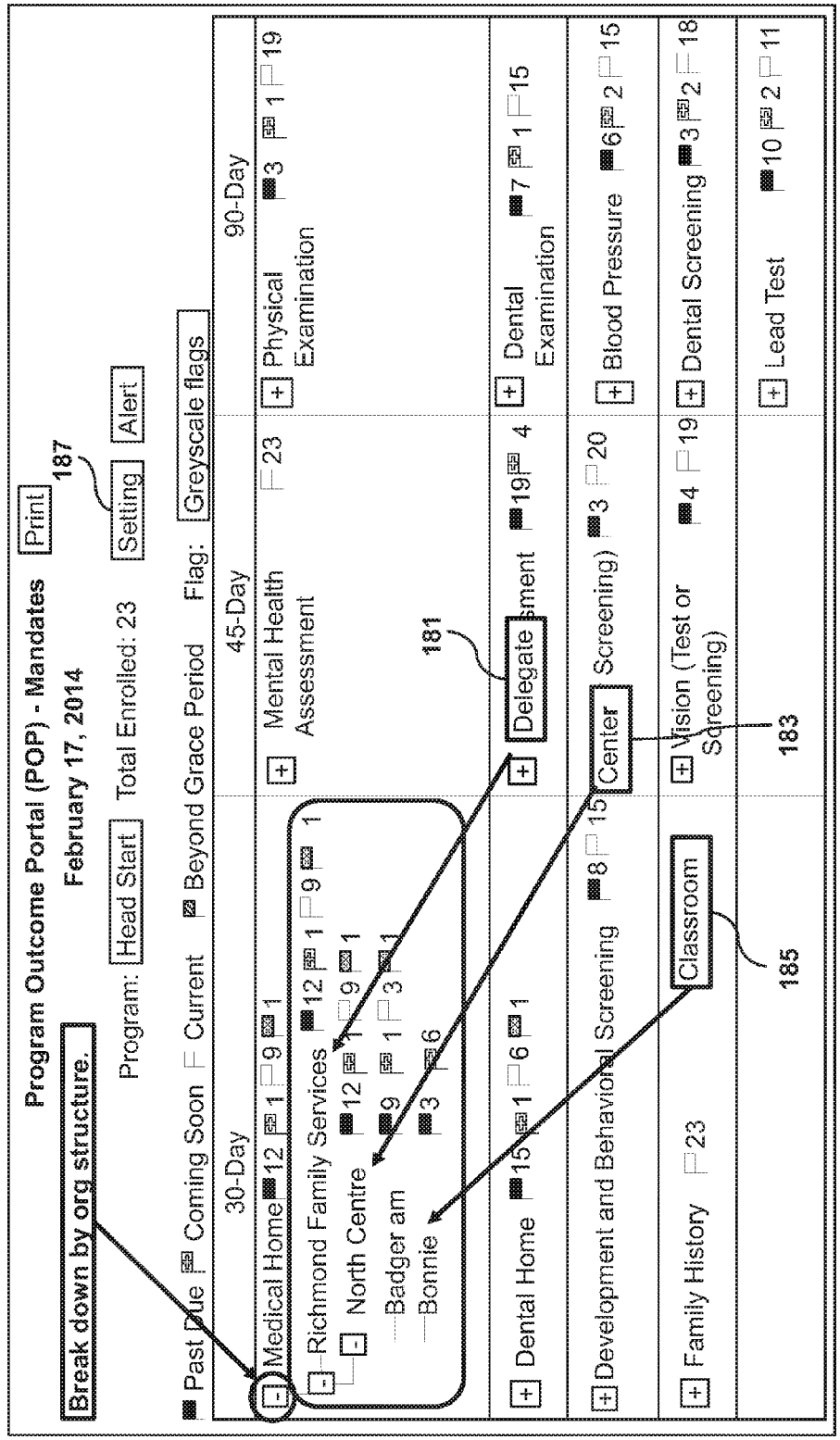
FIG. 18 is a schematic of a screen displayed subsequent to selection of the [+] symbol 173 adjacent Medical Home in FIG. 17.

FIG. 18 is a schematic of a screen displayed subsequent to selection of the [+] symbol 173 adjacent Medical Home in FIG. 17. As shown in FIG. 18, the system allows users to break down any of these agency level numbers by the agency's organizational structure. Specifically, FIG. 18 shows that if a user selects the [+] symbol adjacent the Medical Home category, a display is provided in which the relevant numbers are distributed among the agency's delegate 181, locations (centers) 183, and classrooms 185.

In accordance with some embodiments, the methods and systems are configured to provide or customize access to certain amounts of this data. Thus, the methods and systems of some embodiments are configured to enable a user, such as an administrator, to customize the POP to show or hide certain columns.

In some embodiments, this operation is performed by selecting a [Setting] button, such as the [Setting] button 187 of FIG. 18. In other words, a system administrator or other user can select the [Setting] button 187 on the top of a POP page of FIG. 18 to initiate a process to hide/show certain categories as well as control the display orders.

Figure 19:
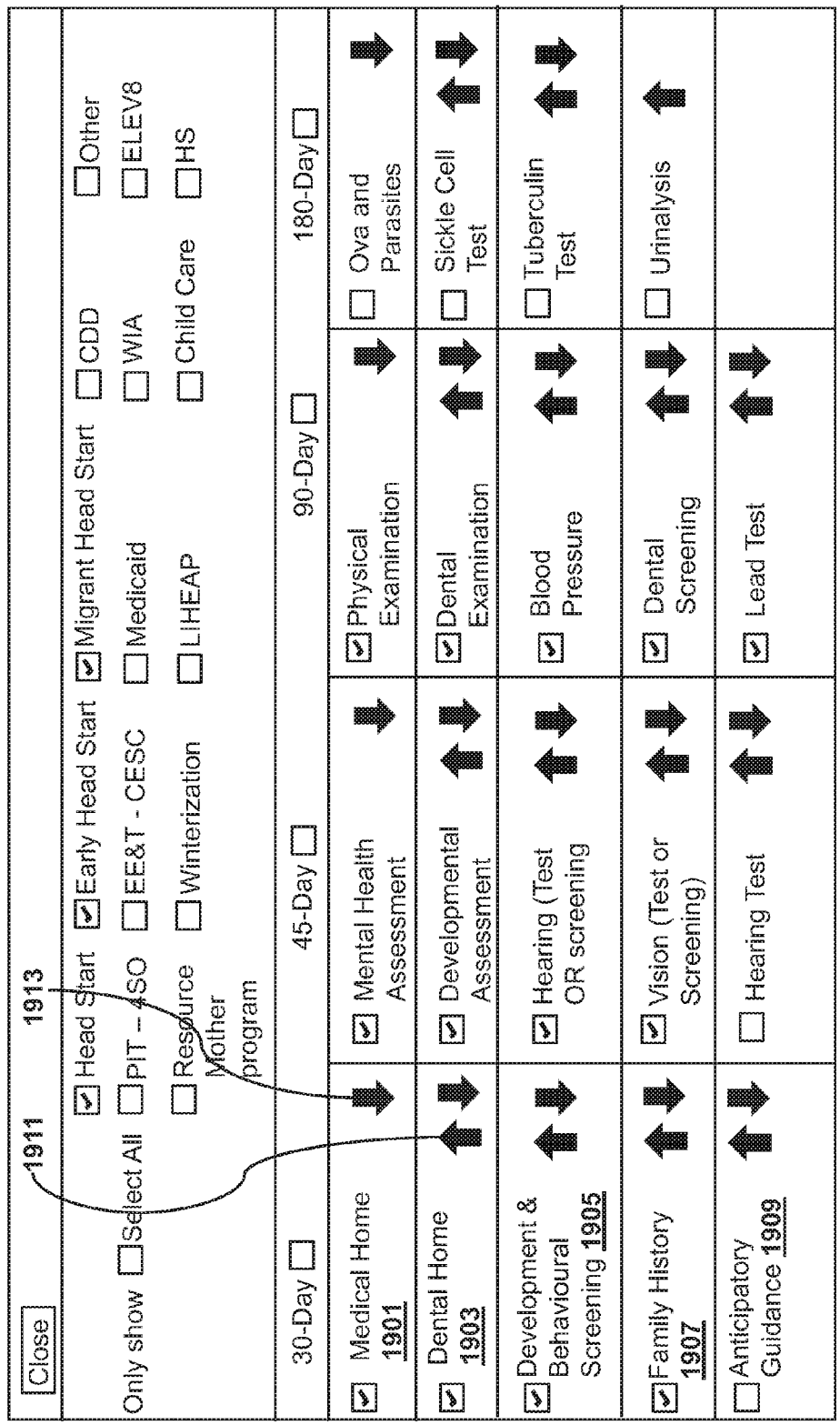
FIG. 19 is a schematic of a screen displayed subsequent to selection of the [Setting] button of FIG. 18.

FIG. 19 is a schematic of a screen displayed subsequent to selection of the [Setting] button of FIG. 18. As illustrated in FIG. 19, users, such as administrators, can select the checkbox to show or hide a category, and click the up/down arrows to control the display order. For example, as shown in FIG. 19, the following categories of data are selected for the 30-day requirements: medical home 1901, dental home 1903, developmental and behavioral screening 1905, and family history 1907, and thus information relating to these categories can be shown to users. Contrarily, information relating to the categories that are not selected for the 30-day requirements, such as anticipatory guidance 1909, will not be shown to users. The up arrows 1911 and down arrows 1913 and be selected to change the order of the list of categories. These same operations are applicable for the other requirements, i.e., 45 day, 90 day, and 180 day.

In accordance with some embodiments, the methods and systems are configured to enable users to receive alerts, such as via any medium including but not limited to email, text messaging, SMS, etc., depending on the status. For example, these alerts can be transmitted and/or received if certain deadlines are approaching ("coming soon") and/or missed ("Past due"). Some of these or other embodiments enable the alerts to be transmitted and/or received at predetermined intervals, such as daily, weekly, or monthly.

Some of the alerts sent by email to users are automatically documented in the system. The determination as to which user groups receive alerts is initiated by selecting an [Alert] button to pop up a window, such as via the screen shown in FIG. 20. FIG. 20 is a schematic of a screen that enables users to determine which user groups receive alerts. The administrator can determine which user group receives alerts on what categories of events, and whether to receive the detailed listing. For example, as shown in FIG. 20, all users in the FSW user group 2001 are designated to receive alerts in the following categories: developmental assessment 2003 and physical exam 2007. Also, all users in the data entry user group 2001 are designated to receive alerts for medical home 2005. The user groups receive the alerts based on the indication of yes in the display participant listings 2009.

In accordance with some embodiments, the methods and systems are configured to provide access to certain amounts of data depending of the user. For example, the systems and methods may automatically show/hide certain rows or columns (or certain data in certain rows and/or columns) based on each user's level of access.

The system controls user access using a two-dimensional structure, including organizational access and content access. The organizational access dimension determines which part of the organizational tree the user can access. The content access dimension determines what content/information the user can access. For example, both user A and user B can access the "Physical Exam" content, which is an example of the content access dimension. However, user A's organizational access is limited to Center A, while user B's organizational access is not limited to Center B. Therefore, user A can only access children's "Physical Exam" content/event in Center A, but not Center B's children. However, user B can access children's "Physical Exam" content/event for both centers A and B.

Figure 21:
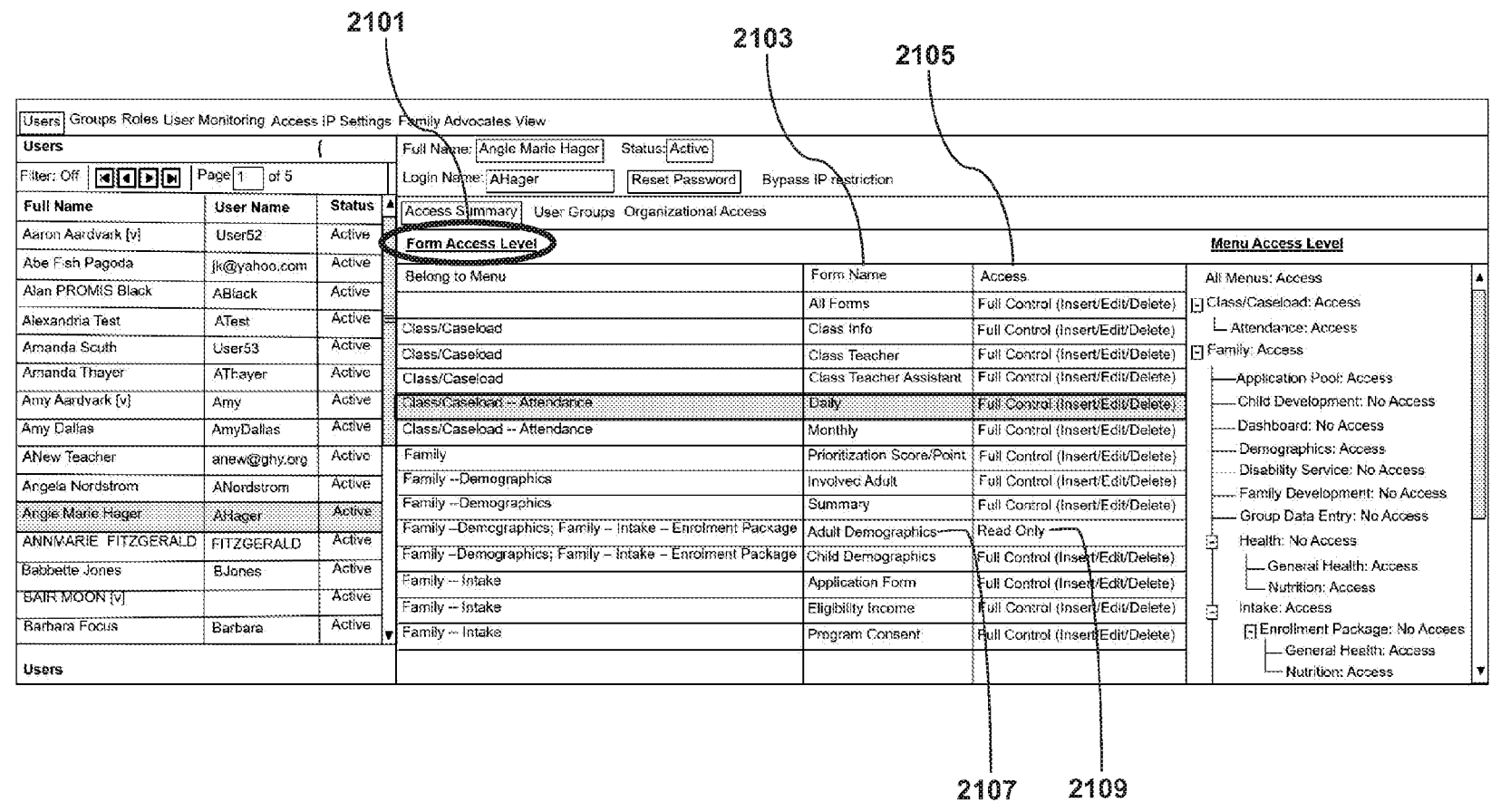

FIG. 21 is a schematic of a screen that shows how the content dimension is controlled. The content access is controlled by using 4 levels of access to forms or screens, i.e., 1) No access; 2) Read only; 3) Read and update; and 4) Read, and update and delete for each screen or form. For example, FIG. 21 shows a forms access level 2101, the form name 2103, and the level of access 2105. For example, the subject user AHager has read only access right 2109 to the adult demographics 2107 form.

FIG. 22 is a schematic of a screen that shows how the organization dimension 2201 is controlled. Each individual user has a unique set of organizational units she/he has access to. For example, the subject user AHager has full organizational access 2203 to the organization unit Richmond Family Services 2205.

III. Event and Event Schedule Builder

In accordance with some embodiments, the systems and methods are configured to enable users to build their own events and event schedulers. In some of these embodiments, the event includes a series of occurrences, and an event scheduler includes a set of events.

In some of these embodiments, each event is linked to a set of data entry forms. A date field on the form is checked to determine whether the form meets the event occurrence's requirement. This operation can be performed by determining whether the data field falls between the event occurrences' acceptable or catch-up data range. The acceptable or catch-up data range is calculated based on either the previous occurrence or the client age depending on how the agency's system administrator configures the event.

Figure 23:
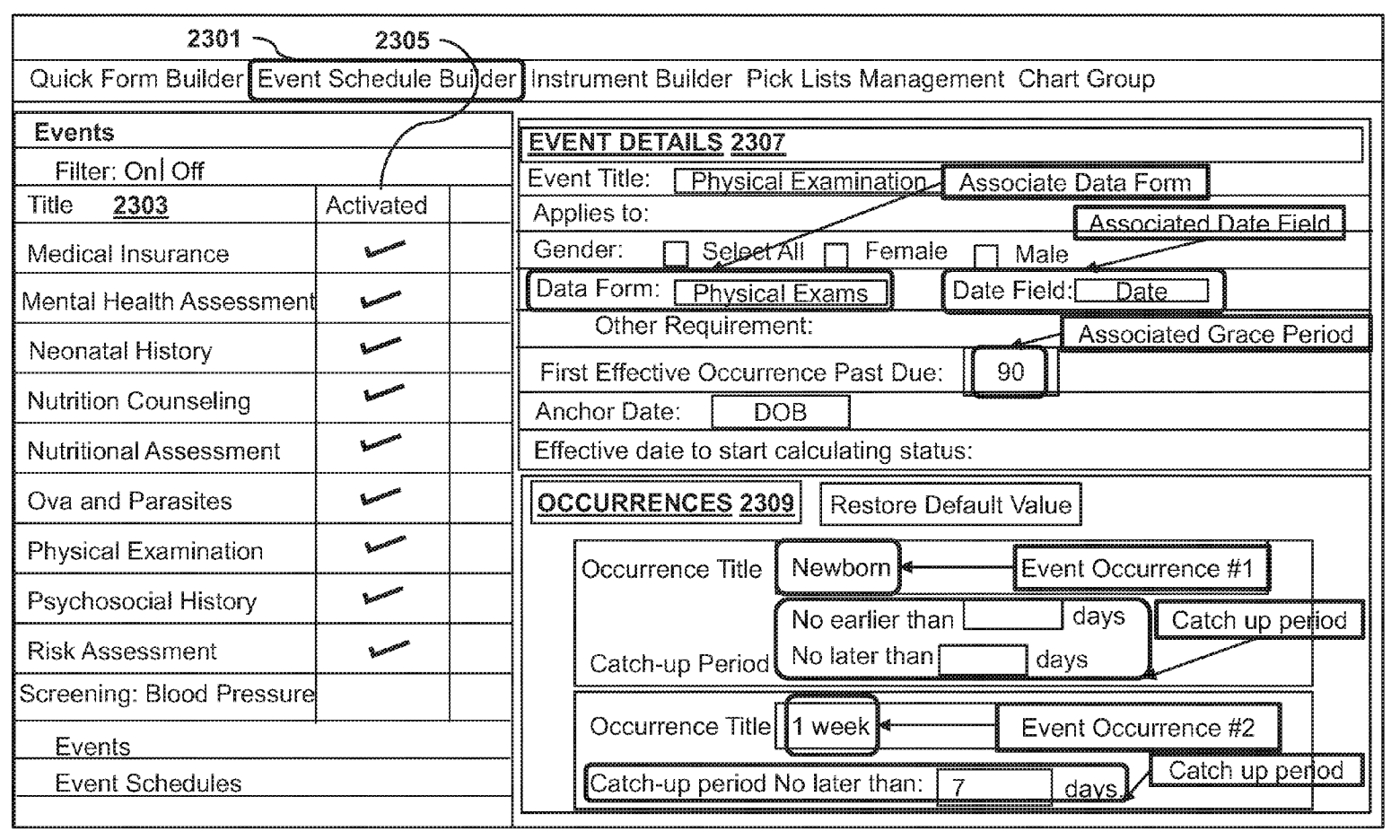

FIG. 23 is a schematic of a screen that provides details as to how users, such as system administrators, can design an event using the event builder. An event can be created or built by an agency based on its own environment and requirement, such as grace period and due dates. Events are the basic building blocks of the monitoring system. Events drive all the POP events and other non-POP events.

One embodiment of the event scheduler is the EPSDT (The Early and Periodic Screening, Diagnostic, and Treatment) schedule, which differs from state to state. Agency administrators can set up their own event schedule to meet the local requirement.

As shown in FIG. 23, the event schedule builder 2301 includes the title 2303 of the events, and an indication as to whether they are actuated 2305. Further information is available in the event details field 2307 and the occurrences field 2309.

Figure 24:
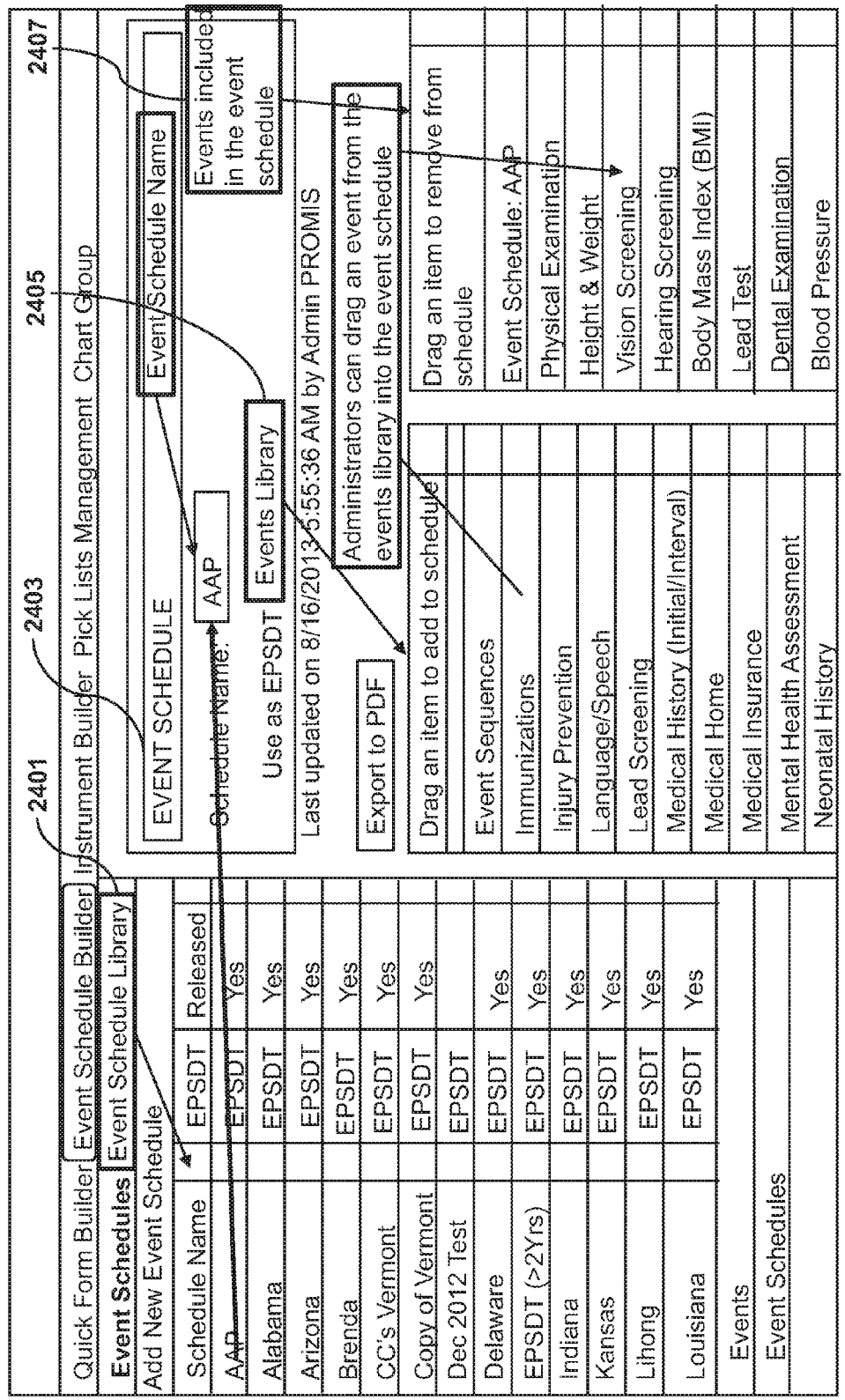
FIG. 24 is a schematic of a screen that provides details as to how a system administrator user can assemble an EPSDT schedule by simply dragging and dropping events into an event schedule.

FIG. 24 is a schematic of a screen that provides details as to how a system administrator user can assemble an EPSDT schedule by simply dragging and dropping events into an event schedule. An agency can quickly create its own schedule of events for their users to monitor all the events on the schedule.

As shown in FIG. 24, AAP in the event schedule library 2401 is shown in the event schedule 2403. Administrators can drag an event from the events library 2405 into the events schedule 2407.

Figure 25:
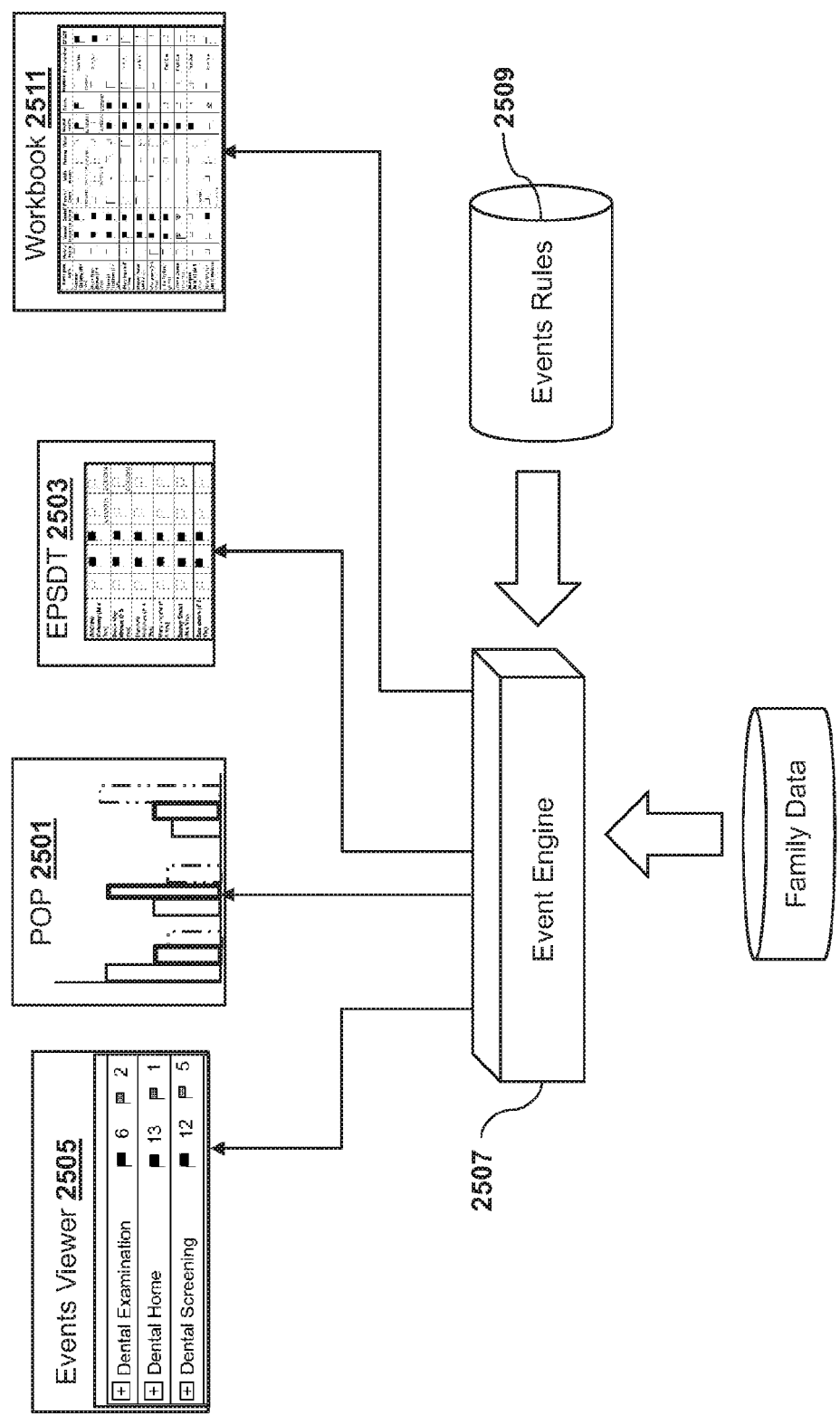
FIG. 25 is a schematic that shows how family data is transformed into an easy to read and understand format, such as the POP, EPSDT and family event viewer based on the business rules defined by the event builder.

The Event Engine in the system's software plays the role in transforming family data into an easy to read and understand format, such as the POP, EPSDT and family event viewer based on the business rules defined by the event builder. FIG. 25 is a schematic that shows how family data is transformed into an easy to read and understand format, such as the POP 2501, EPSDT 2503 and family event viewer 2505 based on the business rules defined by the event builder. The Event Engine 2507 is the core software that interprets a family data record based on the Event Rules 2509 to inform the users if a particular event for a family is Past due, About to expire, Current, or Complete, shown as the Events Viewer 2505 and EPSDT 2503. With this data interpreted on the family level data, software can then aggregate the data on the classroom, center, delegate or agency level, show on the Workbook 2511, POP 2501 and other reports.

As shown in FIG. 25, the Event Engine 2507 is the core technology of the system's software for transforming family data into monitor-able information. As shown in the Event Builder image, the Event Engine 2507 transforms family data based the rules set up in the Event Builder, including but not limited to:

(1) The event due grace period, e.g., 45 days of the Effective Date;

(2) Effective date can be participant's program enrollment date, first day of service, etc.;

(3) Reoccurrence due grace period, e.g., 7 days;

(4) Anchor date can be participant's DOB, program enrollment date, etc.;

(5) Applicable age range and programs;

(6) Properties of Occurrence a. Required or option;

b. Due date;

c. Catch up period.

While POP and Workbook provide a user, such as a HS manager, an overview of the information that is beneficial to high level management decisions and data update, the Event Viewer and EPSDT are two examples of how the transformed data are presented on an individual participant's level (say a child or a family).

Figure 26:
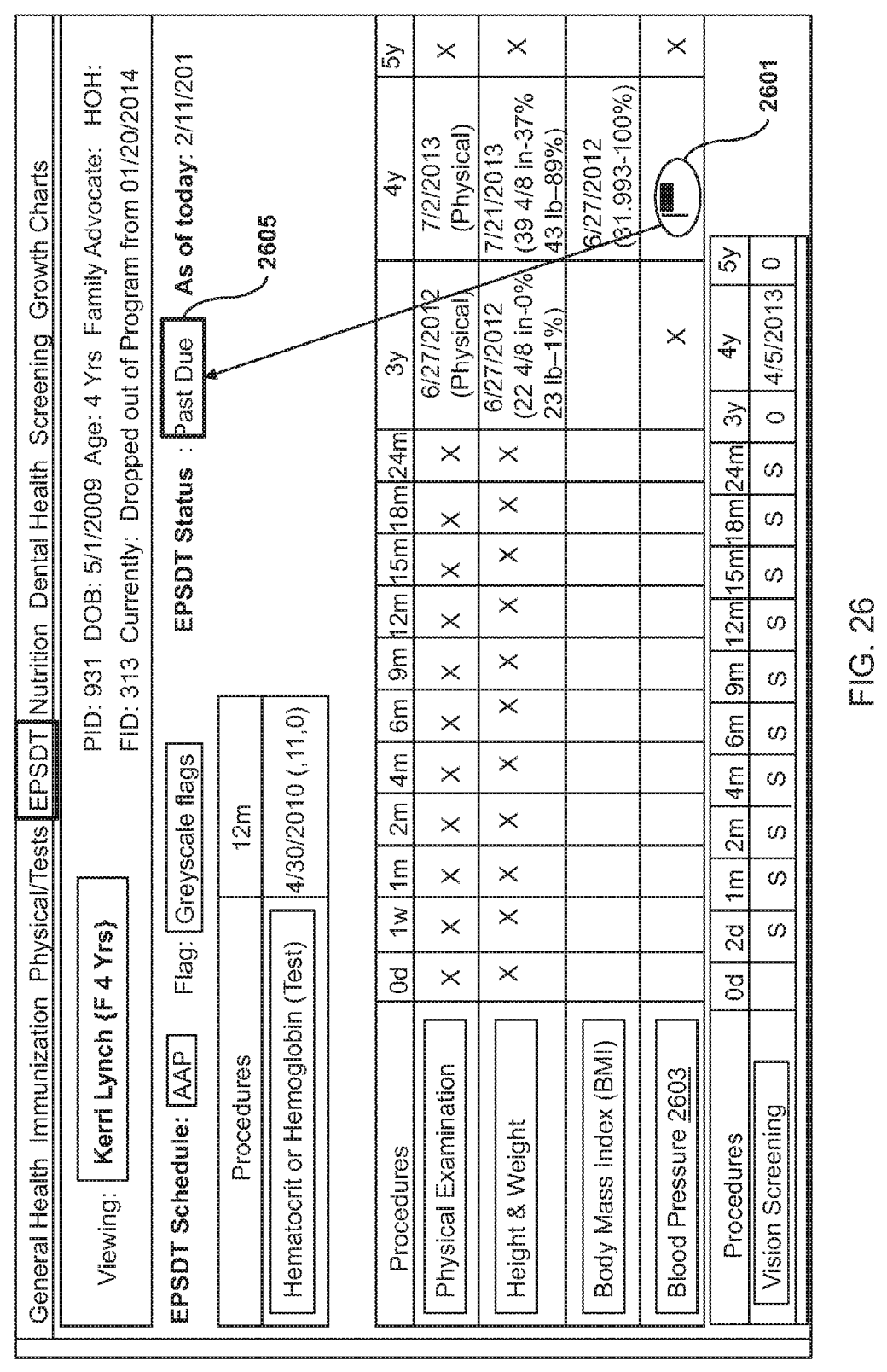

FIG. 26 is a schematic of a screen that illustrates a child's EPSDT schedule. On the child level (or family level), an event schedule shows a set of events and associated status. FIG. 26 shows that this child is past due (black flag 2601) on the Blood Pressure event 2603, and therefore a past due status 2605 for the schedule.

FIG. 27 is a schematic of a screen that illustrates a child's event viewer. A user can at a glance look at all events for one child, and therefore easily identify past due and coming soon events. For example, FIG. 27 provides detailed information for a child named Kerri Lynch 2701.

IV. Exemplary Algorithm

Figure 28:
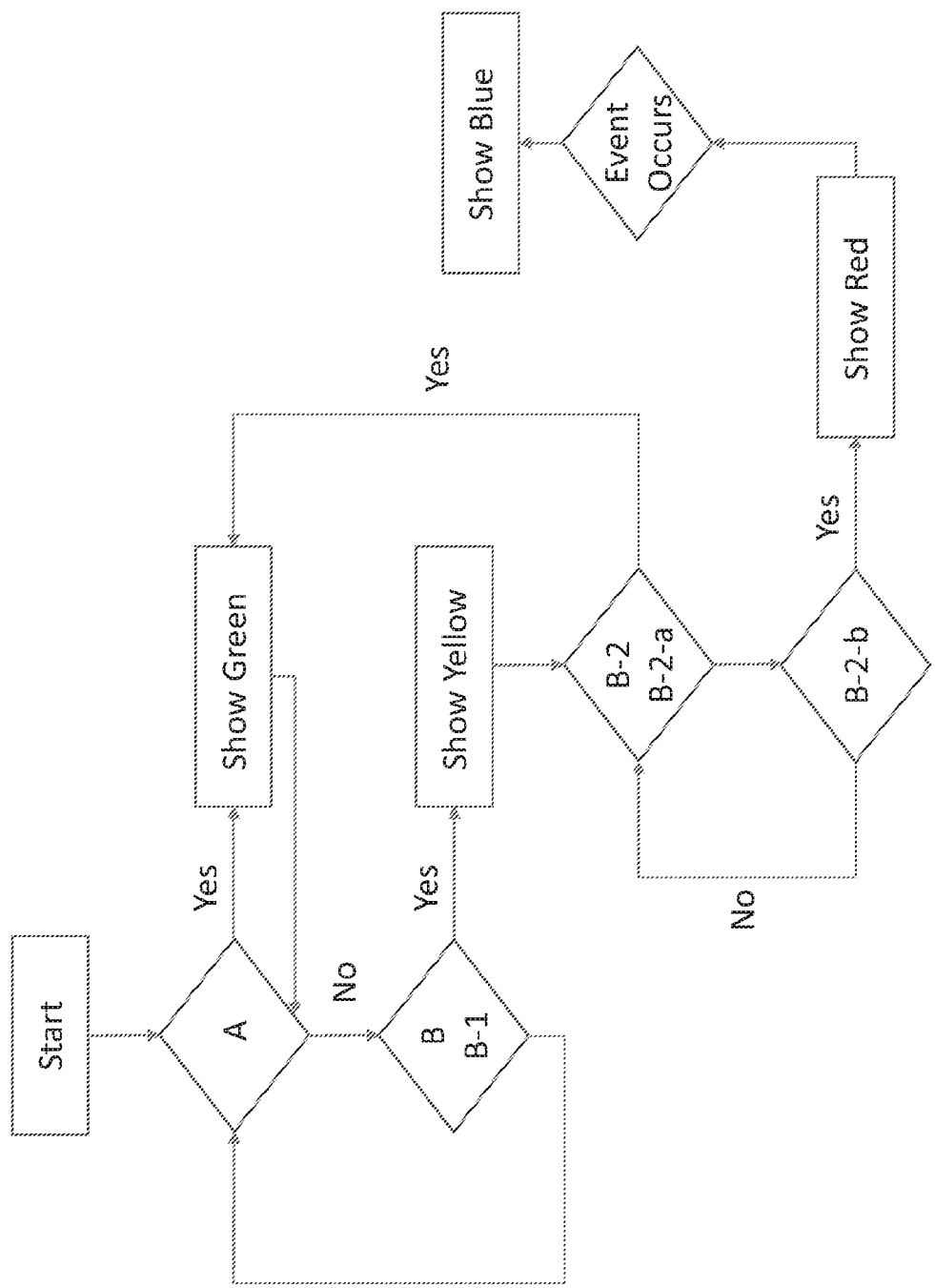
FIG. 28 is a flow chart illustrating a sample algorithm according to the disclosure.

The following example of a 45-day grace period demonstrates the data transformation logic for the POP Mandates. This process is illustrated in FIG. 28 with alphanumeric references to the discuss ion below.

A: If there is a form record containing form date that is within the subject occurrence due date range or catch up data range, show green.

B: If there is no form record containing form date that is within the subject occurrence due date range or catch up data range and B-1: If today is prior to the 45$^{th}$ day, show yellow flag. Reason: The participant is still current and the yellow flag is to remind the agency to complete the event occurrence.

B-2: If today is after the 45$^{th}$ day and

B-2-a: If the 45$^{th}$ day is before the "occurrence due end date", then the yellow flag should become green and remain green. Reason: The child was current within the entire 45-day period.

B-2-b: If the 45$^{th}$ day is after the "occurrence due end date", then the yellow flag should become red and remain red until it becomes blue when additional form is entered.

V. Other Alternatives

Although an event status is typically represented by one of the colored flags as described above, users can choose different set of symbols on a personal level, such as a green check mark ✓ for current or up to date, a yellow bell for due coming up, a red check mark X for past due, etc.

Exemplary embodiments are intended to cover all software or computer programs capable of performing the various heretofore-disclosed determinations, calculations, etc. For example, exemplary embodiments are intended to cover all software or computer programs capable of enabling the processors disclosed above to implement the disclosed processes. In other words, exemplary embodiments are intended to cover all systems and processes that configure a document operating system to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

While certain embodiments of the invention are described above, it should be understood that the invention can be embodied and configured in many different ways without departing from the spirit and scope of the invention. For example, While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A non-transitory computer-readable medium storing instructions for causing at least one electronic digital processor to perform a series of operations for facilitating management and processing of data relating to changing conditions of one or more subjects involved in a government-sponsored social program, comprising:

retrieving digital data from a digital data source in a first format;

transforming the digital data by the at least one electronic digital processor into a second format in accordance with rules stored in the non-transitory computer-readable medium, based on at least:
(1) an event due grace period starting from an effective due date for the event;
(2) an event reoccurrence due date grace period;
(3) an age range of at least a first subject of the one or more subjects; and
(4) a selection of applicable programs for the subject based at least on the age range of the first subject of the one or more subjects;

displaying multiple subjects in accordance with rules stored in the non-transitory computer readable medium and the above requirements, which form a group of subjects involved in the government-sponsored social program, in one of a column and row format;

displaying multiple requirements in accordance with rules stored in the non-transitory computer readable medium, which each of the multiple subjects are required to satisfy within a certain deadline pursuant to the government-sponsored social program, in the other of the column and row format, such that the displayed multiple subjects and multiple requirements form a matrix;

displaying one of multiple identifiers in accordance with rules stored in the non-transitory computer readable medium at each of the intersections of the matrix that indicates status of the requirement relevant to the associated subject, each of the multiple identifiers being visually unique to enable identification of the relevant status; and providing additional data relating to one of the subjects, requirements and status indications upon selection of the corresponding identifier in accordance with rules stored in the non-transitory computer readable medium; wherein the second data format includes at least one of a Programs Outcomes Portal (POP) format, an Early Periodic Screening, Diagnosis, and Treatment (EPSDT) format, a Workbook format and an Events Viewer format, and the identifiers provide at least the following status indications: current, deadline approaching, deadline past due, and past due deadline satisfied.

2. The non-transitory computer-readable medium according to claim 1, wherein the multiple identifiers are visually unique by virtue of their being displayed in different colors.

3. The non-transitory computer-readable medium according to claim 2, wherein the identifier indicating the current status is displayed as green, the identifier indicating the deadline approaching status is displayed as yellow, the identifier indicating the deadline past due status is displayed as red, and the identifier indicating the past due deadline satisfied status is displayed as blue.

4. The non-transitory computer-readable medium according to claim 1, wherein the multiple identifiers are visually unique by virtue of their being displayed differently in greyscale.

5. The non-transitory computer-readable medium according to claim 4, wherein the identifier indicating the current status is displayed as grey, the identifier indicating the deadline approaching status is displayed as white, the identifier indicating the deadline past due status is displayed as black, and the identifier indicating the past due deadline satisfied status is displayed as cross-hatching.

6. The non-transitory computer-readable medium according to claim 1, wherein the multiple identifiers are visually unique by virtue of their being displayed as different shapes.

7. The non-transitory computer-readable medium according to claim 6, wherein the identifier indicating the current status is displayed as a check mark, the identifier indicating the deadline approaching status is displayed as a clock, the identifier indicating the deadline past due status is displayed as an X-mark, and the identifier indicating the past due deadline satisfied status is displayed as a check mark within a circle.

8. The non-transitory computer-readable medium according to claim 1, further comprising enabling entry of updated data subsequent to the providing of the additional data relating to one of the subjects, requirements and status indications upon selection of the corresponding identifier, the entered updated data being relevant to the status of the requirement relevant to the associated subject.

9. The non-transitory computer-readable medium according to claim 8, further comprising automatically updating the displayed identifier to correspond to a change in the status of the requirement resulting from the entered updated data.

10. The non-transitory computer-readable medium according to claim 1, further comprising providing alerts upon initiation of at least one of the multiple status indications for the requirements.

11. The non-transitory computer-readable medium according to claim 1, wherein the alerts are provided upon initiation of the deadline approaching status and the deadline past due status.

12. The non-transitory computer-readable storage medium according to claim 1, wherein content access to the one or more subjects is restricted by at least 4 levels of access, including:
(1) No access;
(2) Read only access;
(3) Read and update access; and
(4) Read, and update and delete for each screen or form access.

13. The non-transitory computer-readable storage medium according to claim 1, wherein three or more outcomes listed under a given identifier for the associated subject are trackable.

14. A system for facilitating management and processing of data relating to changing conditions of one or more subjects involved in a government-sponsored social program, comprising a non-transitory computer-readable storage medium that stores instructions, the instructions, when executed on an electronic digital processor, causing a series of operations to be performed, comprising:

retrieving digital data from a digital data source in a first format;

transforming the digital data into a second format by the electronic digital processor in accordance with rules stored in the non-transitory computer-readable medium, based on at least:
(1) an event due grace period starting from an effective due date for the event;
(2) an event reoccurrence due date grace period;
(3) an age range of a first subject of the one or more subjects; and
(4) a selection of applicable programs for the subject based at least on the age range of the first subject;

displaying multiple subjects in accordance with rules stored in the non-transitory computer readable medium and the requirements listed above, which form a group of subjects involved in the government-sponsored social program, in one of a column and row format;

displaying multiple requirements in accordance with rules stored in the non-transitory computer readable medium, which each of the multiple subjects are required to satisfy within a certain deadline pursuant to the government-sponsored social program, in the other of the column and row format, such that the displayed multiple subjects and multiple requirements form a matrix;

displaying one of multiple identifiers at each of the intersections of the matrix that indicates status of the requirement relevant to the associated subject in accordance with rules stored in the non-transitory computer readable medium, each of the multiple identifiers being visually unique to enable identification of the relevant status; and providing additional data relating to one of the subjects, requirements and status indications upon selection of the corresponding identifier in accordance with rules stored in the non-transitory computer readable medium; wherein the second data format includes at least one of a Programs Outcomes Portal (POP) format, an Early Periodic Screening, Diagnosis, and Treatment (EPSDT) format, a Workbook format and an Events Viewer format, and the identifiers provide at least the following status indications: current, deadline approaching, deadline past due, and past due deadline satisfied.

15. The system according to claim 14, wherein the multiple identifiers are visually unique by virtue of their being displayed in different colors.

16. The system according to claim 15, wherein the identifier indicating the current status is displayed as green, the identifier indicating the deadline approaching status is displayed as yellow, the identifier indicating the deadline past due status is displayed as red, and the identifier indicating the past due deadline satisfied status is displayed as blue.

17. The system according to claim 14, wherein the multiple identifiers are visually unique by virtue of their being displayed differently in greyscale.

18. The system according to claim 17, wherein the identifier indicating the current status is displayed as grey, the identifier indicating the deadline approaching status is displayed as white, the identifier indicating the deadline past due status is displayed as black, and the identifier indicating the past due deadline satisfied status is displayed as crosshatching.

19. The system according to claim 14, wherein the multiple identifiers are visually unique by virtue of their being displayed as different shapes.

20. The system according to claim 19, wherein the identifier indicating the current status is displayed as a check mark, the identifier indicating the deadline approaching status is displayed as a clock, the identifier indicating the deadline past due status is displayed as an X-mark, and the identifier indicating the past due deadline satisfied status is displayed as a check mark within a circle.

21. The system according to claim 14, further comprising enabling entry of updated data subsequent to the providing of the additional data relating to one of the subjects, requirements and status indications upon selection of the corresponding identifier, the entered updated data being relevant to the status of the requirement relevant to the associated subject.

22. The system according to claim 21, further comprising automatically updating the displayed identifier to correspond to a change in the status of the requirement resulting from the entered updated data.

23. The system according to claim 14, further comprising providing alerts upon initiation of at least one of the multiple status indications for the requirements.

24. The system according to claim 14, wherein the alerts are provided upon initiation of the deadline approaching status and the deadline past due status.

25. A method of updating an event record relating to information regarding a subject in a government sponsored social program with an n-day grace period event requirement via an electronic digital processor in accordance with instructions stored in a non-transitory computer-readable medium, comprising:
  changing or maintaining a display icon in a first state by the electronic digital processor in accordance with instructions stored in the non-transitory computer-readable medium if there is a form record containing a form date that is within an event occurrence due date range or an event catch-up date range for the subject;
  changing or maintaining a display icon in a different, second state by the electronic digital processor in accordance with instructions stored in the non-transitory computer-readable medium if:
    (1) there is no form record containing an event form date that is within the subject's event occurrence due date range or event catch up data range; and
    (2) if the current date is prior to the n-th day;
  changing or maintaining the display icon from the second state to the first state if:
    (1) the current date is after the n-th day;
    (2) the n-th day is before an event occurrence due end date;
  changing or maintaining the display icon from the second state to a third state different from the first and second states by the electronic digital processor in accordance with instructions stored in the non-transitory computer-readable medium if the n-th day is after the event occurrence due end date; and
  changing the display icon from the third state to a fourth state different from the first through third states by the electronic digital processor in accordance with instructions stored in the non-transitory computer-readable medium if an additional event form is entered indicating that the event has been completed.

* * * * *